United States Patent
Elings et al.

(10) Patent No.: US 9,805,003 B2
(45) Date of Patent: Oct. 31, 2017

(54) REARRANGING LAYOUTS FOR DIFFERENT DISPLAYS

(71) Applicant: Apple Inc., Cupertino, CA (US)

(72) Inventors: Michel Elings, Palo Alto, CA (US); Pepijn T. Zoon, San Francisco, CA (US); Douwe H. Homans, Santa Clara, CA (US); Jean S. Metz, Santa Clara, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 14/866,947

(22) Filed: Sep. 26, 2015

(65) Prior Publication Data

US 2016/0292134 A1   Oct. 6, 2016

Related U.S. Application Data

(60) Provisional application No. 62/142,444, filed on Apr. 2, 2015, provisional application No. 62/172,129, filed on Jun. 7, 2015.

(51) Int. Cl.
*G06F 17/00* (2006.01)
*G06F 17/21* (2006.01)
*G06F 17/22* (2006.01)

(52) U.S. Cl.
CPC ........ *G06F 17/212* (2013.01); *G06F 17/2229* (2013.01)

(58) Field of Classification Search
CPC ... G06F 17/212; G06F 17/2247; G06F 17/272
USPC ....................................................... 715/243
See application file for complete search history.

(56) References Cited

U.S. PATENT DOCUMENTS

| | | | |
|---|---|---|---|
| 6,023,714 A | 2/2000 | Hill et al. | |
| 7,640,516 B2 | 12/2009 | Atkins | |
| 7,788,579 B2 | 8/2010 | Berkner et al. | |
| 8,291,314 B2 | 10/2012 | Atkins | |
| 8,327,262 B2 | 12/2012 | Tarumi | |
| 8,665,294 B2 | 3/2014 | Hirooka | |
| 9,152,292 B2 | 10/2015 | Xiao et al. | |
| 9,348,801 B2 | 5/2016 | Oliveira et al. | |
| 9,396,167 B2 | 7/2016 | Doll et al. | |
| 2005/0055635 A1 | 3/2005 | Bargeron et al. | |
| 2005/0210399 A1 | 9/2005 | Filner et al. | |
| 2008/0301545 A1 | 12/2008 | Zhang et al. | |
| 2014/0059424 A1 | 2/2014 | Kim | |

(Continued)

*Primary Examiner* — Shawn S Joseph
(74) *Attorney, Agent, or Firm* — Fletcher Yoder PC

(57) ABSTRACT

Some embodiments provide a method for rearranging a content layout. The method receives a first content layout including several content elements arranged across a first set of vertical layout sections, each of which occupies a same first amount of horizontal space in the first content layout. At least one of the content elements spans several of the vertical layout sections of the first set. The method identifies a number of vertical layout sections available with which to display the first content layout. The method rearranges the several content elements into a second content layout including the several content elements arranged across a second set of vertical layout sections, each of which occupies a same second amount of horizontal space in the second content layout. At least one of the content elements spans a different number of vertical layout sections in the first content layout and the second content layout.

23 Claims, 20 Drawing Sheets

(56) References Cited

U.S. PATENT DOCUMENTS

| | | |
|---|---|---|
| 2014/0181646 A1 | 6/2014 | Rangwala et al. |
| 2014/0229818 A1 | 8/2014 | Goswami |
| 2014/0258849 A1* | 9/2014 | Chung .................. G06F 17/212 715/243 |
| 2015/0006135 A1 | 1/2015 | Deb et al. |
| 2015/0074518 A1 | 3/2015 | Rumsey et al. |

* cited by examiner

REARRANGING LAYOUTS FOR DIFFERENT DISPLAYS

BACKGROUND

Electronic visual content, such as electronic books or magazines, is generally designed for a particular type of display. The author of an electronic document will typically lay out content in a specific way (e.g., page by page), envisioning the display of a page on a specific size screen. In general, when viewed on a different size screen than that for which the document is designed, the layout is reduced or expanded as a whole. This may result in content that is difficult to read on a smaller device without zooming in, at which point the user needs to scroll both horizontally and vertically to view all of the content.

BRIEF SUMMARY

Some embodiments provide a method for arranging a content layout for display on a particular device in a particular orientation. The method receives the content layout as one or more content blocks (e.g., various types of text blocks, images, videos, etc.) arranged across a first number of vertical layout sections (e.g., 5, 7, 8, etc.), each of which is the same width (with equal-width spacing between the vertical layout sections). Each of the content blocks in the layout horizontally spans one or more of the vertical layout sections, with the content blocks arranged in the layout in a particular order. Based on the device and orientation for displaying the content layout, the method identifies a second number of vertical layout sections available for display, which may be different than the first number of vertical layout sections for which the content layout is defined. Based on the different numbers of vertical layout sections, the method of some embodiments resizes and rearranges the content blocks to form a new content layout for output on the particular device in the particular orientation. In many cases, some or all of the content blocks will span a different number of vertical layout sections in the new content layout.

In some embodiments, the author of the content layout (e.g., an electronic document, book, magazine article, word processing document, slide of a presentation, etc.) designs the document for a particular number of layout sections (also referred to as columns, though the behavior is different than columns of text in a standard word processor). For instance, a common design layout uses 7 layout sections. Each content block is assigned to a particular integer number of sections in the layout. For example, an image might span numerous sections (as would its caption text), and body text will often span all of the sections of the layout. As mentioned, though these sections are often referred to as columns, a text block that spans several columns will have each of its lines of text spanning all of the columns (unless the text is flowing around another content block), rather than the text filling up a first column and then continuing at the top of the next column).

However, various devices in different orientations may use different numbers of vertical sections to display content layouts. For instance, if using an approach to keep the width of the sections close to constant across device, then a tablet in landscape orientation will generally have more layout sections than the same tablet in portrait orientation or a smart phone in either orientation, but fewer than a laptop or desktop monitor).

To generate the layout for a device and orientation with a different number of defined layout sections, some embodiments first calculate the width of the margins, sections, and gutters of the new layout. Some embodiments take the width of the gutters in the designed layout (e.g., as a number of pixels) and multiply this by the ratio of the total number of sections in the new layout to the number of sections in the original layout. Thus, for a five-section layout generated from a seven-section layout, the gutter width is the original gutter width in the seven-section layout multiplied by 5/7. A 30-pixel gutter width in the seven-section layout would therefore translate to a 21-pixel gutter width in the five-section layout. Some embodiments keep the margins a constant width between layouts, while other embodiments modify the margin width in the same manner as the gutters (or keep the gutters a constant width between layouts, while modifying only the margin width).

In some embodiments, the device dynamically determines the number of vertical sections to use for a layout based on properties of the layout as received. The layout, in some embodiments, includes a defined margin width and gutter width, as well as a defined section width (in, e.g., pixels). In some embodiments, rather than modifying the gutter width, the device instead applies a function to the margin width (e.g., scaling the margin width as a percentage of the full display width). The device keeps the gutter width the same, and determines how many vertical sections can fully fit within the remaining display width (using the same section width as defined in the received layout). Some embodiments then use this identified number of vertical sections for the layout, making the sections larger as needed to fill the display width.

Some embodiments then resize each of the content blocks from the original layout. To perform such resizing, some embodiments multiply the number of sections spanned by the content block in the original layout by the ratio of the total number of sections in the new layout to the total number of sections in the old layout, then round to the nearest integer (or up to 1 if the result is less than 0.5). For instance, a content block spanning four sections out of seven will be resized to two blocks in a three section layout (4*(3/7)=1.7). The content block is also resized vertically to maintain its aspect ratio, in some embodiments, unless the block is a body text block with text designed to flow around the other blocks.

In addition to resizing the blocks, some embodiments also apply resizing algorithms to some or all of the text used. For example, text used as a title or caption might need to be resized so as to not look excessively large compared to images that have been shrunk down to fit in a smaller number of layout sections. However, simply multiplying the font size by the ratio of number of sections between the original and display layouts will often result in too drastic a change. A title displayed in 70-point font in a seven-section layout should not be shrunk to 10 point font for a one-section layout. Instead, some embodiments use a multiplier that is a function of the number of vertical layout sections, but does not decrease to zero for the hypothetical zero-section layout (e.g., $m=C_1 x+C_2$), where m is the multiplier value, x is the number of sections, and $C_1$ and $C_2$ are constants.

After performing resizing, some embodiments also align the content blocks according to various rules. In some embodiments, body text that spans the width of the entire layout is treated differently than the other content blocks, as the body text flows around the other content blocks. In many cases, content blocks are aligned with other content blocks or anchored to a particular portion of the body text. For example, some embodiments relate each other content block to the first word of body text in the layout, then place the content blocks where space is sufficient in order to best preserve the relation in the new layout, after resizing the content blocks as described above. The method preserves the order of the content blocks, using a left-to-right then top-to-bottom order. However, the designer of the content layout may also align content blocks to other words in the body text, in order to link items to their related text. As the text moves (either due to addition/deletion of text, or resizing for a new layout), the content blocks are moved with the text to which they are linked as much as possible while respecting other content blocks prior to them in the order that are already placed.

In addition to or instead of alignment with body text, some embodiments allow (and may automatically create) anchoring of content blocks to each other. For instance, some embodiments automatically align content blocks to the nearest other content block. If the nearest content block is the body text, then some embodiments align the content block to the closest word to the top of the content block. In addition, some embodiments use the type of content block to make a decision about alignment. As an example, a content block labeled as a caption will be linked to an image if an image is nearby, even if another content block is closer. On the other hand, a content block labeled as a pull quote will be linked to the nearest body text, even if an image is closer.

The rearrangement process on a layout of content blocks may be performed in a nested manner in some embodiments. That is, each content block in a layout may itself contain multiple content blocks. In this case, the method of some embodiments performs the layout rearrangement process to rearrange the content in the main layout, using a method for converting from a first number of layout sections used to design the layout to a second number of layout sections used for displaying the layout on a particular device and orientation. The particular content block that contains additional content blocks will be resized to span a different number of layout sections in this rearrangement. The same rearrangement process is then applied to the internal content blocks nested in the particular content block. For instance, if the particular content block is designed with a five-section width and reduced to a three-section width, then its internal layout will be rearranged as though a five-section layout is being displayed on a three-section layout.

Some embodiments implement the method described above both for content layout design applications (e.g., an electronic book/magazine authoring program, a slide design program, a word processor, etc.) as well as content display applications (e.g., an e-reader, a document viewing program, etc.). The content layout design applications allow the layout designer to view how their layout will be displayed on different devices that have different numbers of layout sections. On the content viewing side, the applications can receive a document designed for a standard number of layout sections and display the layout appropriately in the number of sections for the current device and orientation, thereby preventing the need to distribute separate layouts for different devices. That is, for example, a seven-section layout might be designed and distributed to computers, tablets, and smart phones (and other devices), with the smaller devices handling the rearrangement of the layout for their smaller displays.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description further describe the embodiments described in the Summary as well as other embodiments. Accordingly, to understand all the embodiments described by this document, a full review of the Summary, the Detailed Description, and the Drawings is needed. Moreover, the claimed subject matters are not to be limited by the illustrative details in the Summary, the Detailed Description, and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

Figure 1:
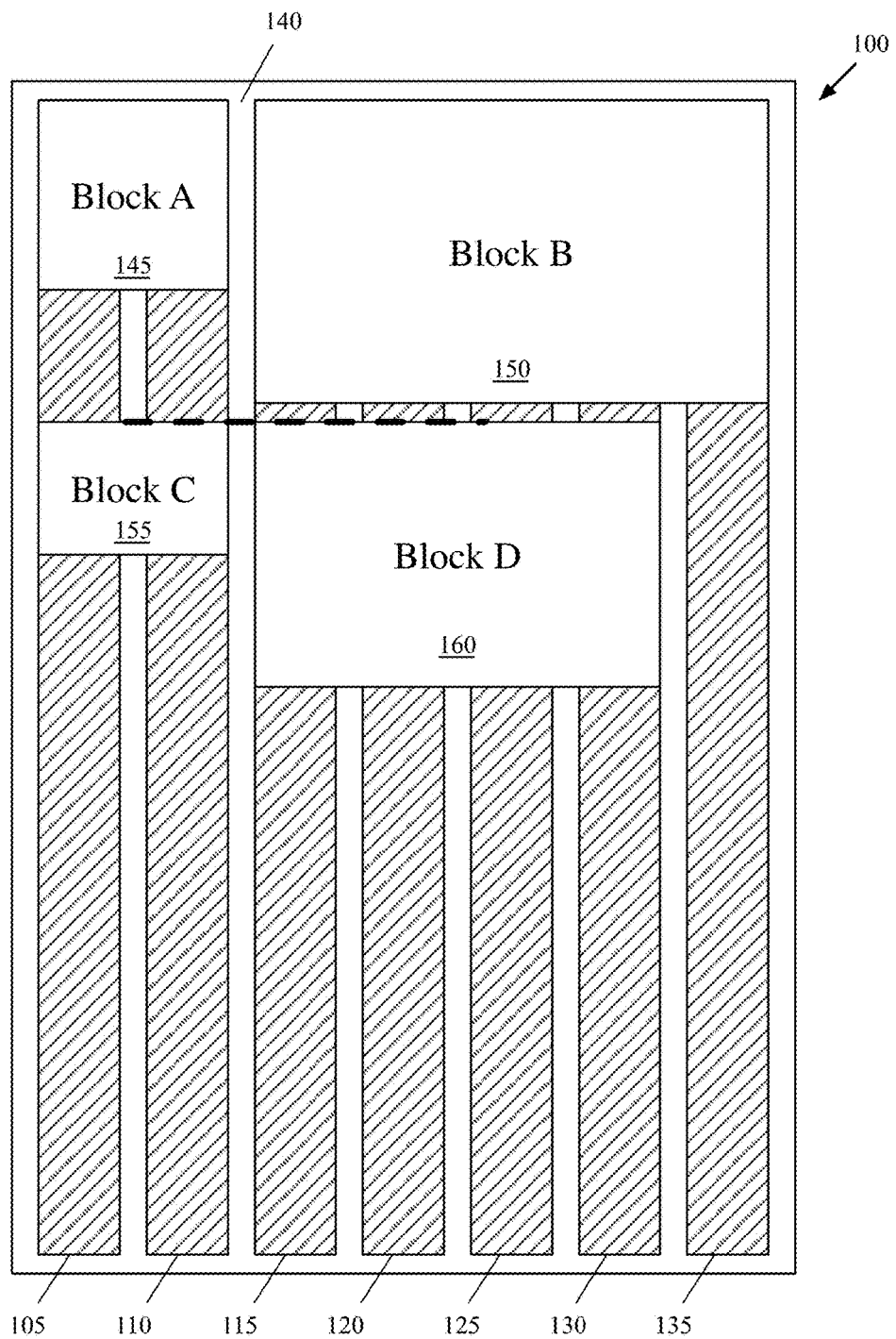
FIG. 1 illustrates a content layout based on seven vertical layout sections.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a method for arranging a content layout for display on a particular device in a particular orientation. The method receives the content layout as one or more content blocks (e.g., various types of text blocks, images, videos, etc.) arranged across a first number of vertical layout sections (e.g., 5, 7, 8, etc.), each of which is the same width (with equal-width spacing between the vertical layout sections). Each of the content blocks in the layout horizontally spans one or more of the vertical layout sections, with the content blocks arranged in the layout in a particular order. Based on the device and orientation for displaying the content layout, the method identifies a second number of vertical layout sections available for display, which may be different than the first number of vertical layout sections for which the content layout is defined. Based on the different numbers of vertical layout sections, the method of some embodiments resizes and rearranges the content blocks to form a new content layout for output on the particular device in the particular orientation. In many cases, some or all of the content blocks will span a different number of vertical layout sections in the new content layout.

In some embodiments, the author of the content layout (e.g., an electronic document, book, magazine article, word processing document, slide of a presentation, etc.) designs the document for a particular number of layout sections (also referred to as columns, though the behavior is different than columns of text in a standard word processor). For instance, a common design layout uses seven layout sections. Each content block is assigned to a particular integer number of sections in the layout. For example, an image might span numerous sections (as would its caption text), and body text will often span all of the sections of the layout. As mentioned, though these sections are often referred to as columns, a text block that spans several columns will have each of its lines of text spanning all of the columns (unless the text is flowing around another content block), rather than the text filling up a first column and then continuing at the top of the next column).

However, various devices in different orientations may use different numbers of vertical sections to display content layouts. For instance, if using an approach to keep the width of the sections close to constant across device, then a tablet in landscape orientation will generally have more layout sections than the same tablet in portrait orientation or a smart phone in either orientation, but fewer than a laptop or desktop monitor).

FIG. 1 illustrates such a content layout 100 based on seven vertical layout sections 105-135. In this figure as well as many of the subsequent figures, the layout sections are indicated as the rectangles filled in with diagonal lines. One of ordinary skill will recognize that for actual display to an end-user, the device would not actually display these layout sections. In the examples given in this document, the layout sections are vertical (and thus may be referred to as columns). This assumes that when viewed on a device, content will be restricted horizontally, and the user of the device may scroll vertically to view additional content (as is the customary manner of viewing content). However, the principles described herein are equally applicable to vertically-restricted layouts, in which the layout sections are horizontal and the user scrolls horizontally to view content that does not initially fit in the device screen.

Between each pair of subsequent layout sections is a space referred to as a gutter (e.g., gutter 140 between sections 110 and 115). In addition, the layout will have left and right (and in some cases top and/or bottom) margins. In some embodiments, the designer of the layout sets these values (e.g., as a number of pixels, as a percentage of the layout section size or total width, etc.), which in turn define the width of the layout sections (assuming on a fixed total width). In other embodiments, the designer defines the layout section width, and the gutters and margins are automatically defined based on the fixed total width.

The content layout 100 includes four rectangular content blocks 145-160 (also referred to as content elements). The examples shown herein include rectangular content blocks (with the possible exception of body text, that flows around other elements in the content layout). However, one of ordinary skill in the art will recognize that non-rectangular content blocks may be used in some embodiments (e.g., L-shaped content blocks, etc.).

In this example, block A 145 is located in the upper left corner of the layout, and spans two layout sections 105 and 110 of the seven total sections. In general, a content block will span from the left edge of its leftmost section to the right edge of its rightmost column, including all of the gutters in between. Thus, the gutters will not always function as whitespace, only doing so in between content blocks. Block B 150 spans five columns next to block A 145, and is larger in height than block A 145 as well.

Blocks C 155 and D 160 are located underneath the bottom of block B 150, with block C 155 spanning two columns and block D 160 spanning four columns. In addition, the designer of the content layout has connected the top edges of these two blocks, such that the blocks will remain aligned at their top edges in other layouts.

Figure 2:
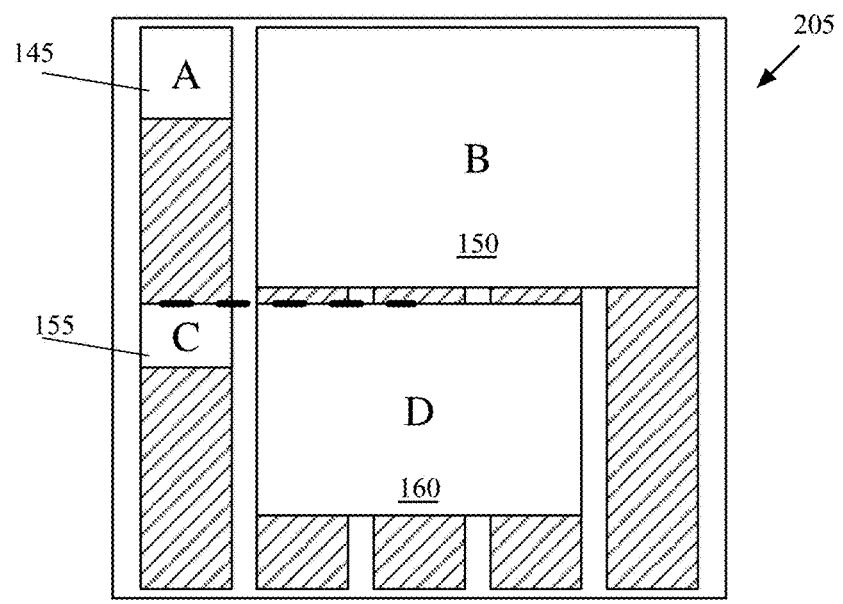
FIG. 2 illustrates three new layouts having five, three, and one vertical layout sections, respectively, based on the designed seven-section layout of FIG. 1.
Figure 2:
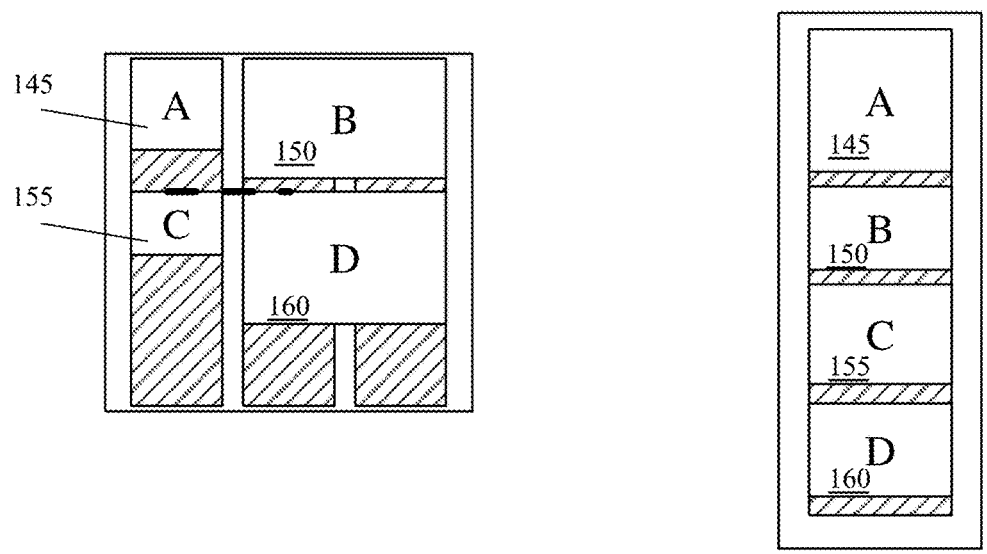

FIG. 2 illustrates new layouts 205, 210, and 215 having five, three, and one vertical layout sections respectively, based on the designed seven-section layout 100. Each of these layouts 205-215 includes the same four content elements 145-160, with different relative sizes to each other (but preserving order and alignment as much as possible).

To generate the layout for a device and orientation with a different number of defined layout sections, some embodiments first calculate the width of the gutters and the margins. Some embodiments take the width of the gutters in the designed layout (e.g., as a number of pixels) and multiply this by the ratio of the total number of sections in the new layout to the number of sections in the original layout. Thus, for the five-section layout 205, the gutter width is the original gutter width in the seven-section layout multiplied by 5/7. A 30-pixel gutter width in the layout 100 would translate to a 21-pixel gutter width in the layout 205. Similarly, the 30-pixel gutter width translates to a 13-pixel gutter in the layout 210 (and there are no gutters in the one-section layout 215). Some embodiments keep the margins a constant width between layouts, while other embodiments modify the margin width in the same manner as the gutters (or keep the gutters a constant width between layouts, while modifying only the margin width).

In some embodiments, the device dynamically determines the number of vertical sections to use for a layout based on properties of the layout as received. The layout, as mentioned, includes a defined margin width and gutter width, as well as a defined section width (in, e.g., pixels). In some embodiments, rather than modifying the gutter width, the device instead applies a function to the margin width (e.g., scaling the margin width as a percentage of the full display width). The device keeps the gutter width the same, and determines how many vertical sections can fully fit within the remaining display width (using the same section width as defined in the received layout). Some embodiments then use this identified number of vertical sections for the layout, making the sections larger as needed to fill the display width.

With the layout sections defined for the new layout (based on the gutter and margin widths, and assuming equal-width layout sections), some embodiments resize each of the content blocks from the original layout, as shown in the layouts 205-210. In the new layouts, each content block spans an integer number of layout sections, and keeps the same aspect ratio as in the original layout 100.

To perform such resizing, some embodiments multiply the number of sections spanned by the content block in the original layout by the ratio of the total number of sections in the new layout to the total number of sections in the old layout, then round to the nearest integer (or up to 1 if the result is less than 0.5). For instance, the content block A 145 spans only one layout section in each of the three layouts 205-215. To calculate this number of sections for the five-section layout 205, the two sections spanned in the seven-section layout are multiplied by 5/7 to get (2*(5/7)=1.4), which rounds to one layout section in the five-section layout. As another example, the content block B 150 spans five sections of the seven-section layout 100, so for the three-section layout 210 this content block spans two sections (5*(3/7)=2.1). This ends up being the same width as block D 160, which translates from four sections in the seven-section layout 100 to two sections (4*(3/7)=1.7) in the three-section layout 210. Thus, the relative sizes of content blocks may vary in relation to each other (block A 145 and block B 150 have a greater size disparity in the five-section layout 205 and less of a disparity in the three-section layout 210). However, methods that simply scale the layout as a whole based simply on pixel size often end up with some of the content being extremely small and impossible to view without zooming in (which then requires both horizontal and vertical scrolling to view all of the content in the layout).

In addition to resizing the blocks, some embodiments also apply resizing algorithms to some of the text used in the content layout. For example, text used as a title or caption might need to be resized so as to not look excessively large compared to images that have been shrunk down to fit in a smaller number of layout sections. However, simply multiplying the font size by the ratio of number of sections between the original and display layouts will often result in too drastic a change. A title displayed in 70-point font in a seven-section layout should not be shrunk to 10 point font for a one-section layout. Instead, some embodiments use a multiplier that is a function of the number of vertical layout sections, but does not decrease to zero for the hypothetical zero-section layout (e.g., $m=C_1 x+C_2$, where m is the multiplier value applied to the font size, x is the number of sections, and $C_1$ and $C_2$ are positive constants between 0 and 1).

After performing resizing, some embodiments also align the content blocks according to various rules. In some embodiments, body text that spans the width of the entire layout is treated differently than the other content blocks, as the body text flows around the other content blocks. In many cases, content blocks are aligned with other content blocks or anchored to a particular portion of the body text. For example, some embodiments relate each other content block to the first word of body text in the layout, then place the content blocks where space is sufficient in order to best preserve the relation in the new layout, after resizing the content blocks as described above. The method preserves the order of the content blocks, using a left-to-right then top-to-bottom order. However, the designer of the content layout may also align content blocks to other words in the body text, in order to link items to their related text. As the text moves (either due to addition/deletion of text, or resizing for a new layout), the content blocks are moved with the text to which they are linked as much as possible while respecting other content blocks prior to them in the order that are already placed.

In addition to or instead of alignment with body text, some embodiments allow (and may automatically create) anchoring of content blocks to each other. For instance, some embodiments automatically align content blocks to the nearest other content block. If the nearest content block is the body text, then some embodiments align the content block to the closest word to the top of the content block. In addition, some embodiments use the type of content block to make a decision about alignment. As an example, a content block labeled as a caption will be linked to an image if an image is nearby, even if another content block is closer. On the other hand, a content block labeled as a pull quote will be linked to the nearest body text, even if an image is closer.

In the example layout 100 of FIG. 1, the layout author/designer has aligned the top edges of content blocks C 155 and D 160. Thus, in the five-section layout 205 and the three-section layout 210, these blocks remain aligned. However, in the one-section layout, horizontally-aligned content blocks can no longer remain aligned, as two content blocks can no longer be placed next to each other. Instead, the blocks are stacked on top of each other, with content block C 155 directly above content block D 160.

The rearrangement process on a layout of content blocks may be performed in a nested manner in some embodiments. That is, each content block in a layout may itself contain multiple content blocks. In this case, the method of some embodiments performs the layout rearrangement process to rearrange the content in the main layout, using a method for converting from a first number of layout sections used to design the layout to a second number of layout sections used for displaying the layout on a particular device and orientation. The particular content block that contains additional content blocks will be resized to span a different number of layout sections in this rearrangement. The same rearrangement process is then applied to the internal content blocks nested in the particular content block. For instance, if the particular content block is designed with a five-section width and reduced to a three-section width, then its internal layout will be rearranged as though a five-section layout is being displayed on a three-section layout.

Some embodiments implement the method described above both for content layout design applications (e.g., an electronic book/magazine authoring program, a slide design program, a word processor, etc.) as well as content display applications (e.g., an e-reader, a document viewing program, etc.). The content layout design applications allow the layout designer to view how their layout will be displayed on different devices that have different numbers of layout sections. On the content viewing side, the applications can receive a document designed for a standard number of layout sections and display the layout appropriately in the number of sections for the current device and orientation, thereby preventing the need to distribute separate layouts for different devices. That is, for example, a seven-section layout might be designed and distributed to computers, tablets, and smart phones (and other devices), with the smaller devices handling the rearrangement of the layout for their smaller displays.

FIGS. 1 and 2 illustrate examples of the rearrangement of content layouts for different types of displays. Several more detailed examples are described below. Section I describes the process performed by some embodiments to perform the layout rearrangement. Section II describes the performance of such a process on a device being used to generate content, while Section III describes the process on a device used to view content. Finally, Section IV describes an electronic system with which some embodiments of the invention are implemented.

I. Process for Rearranging Layouts

Figure 3:
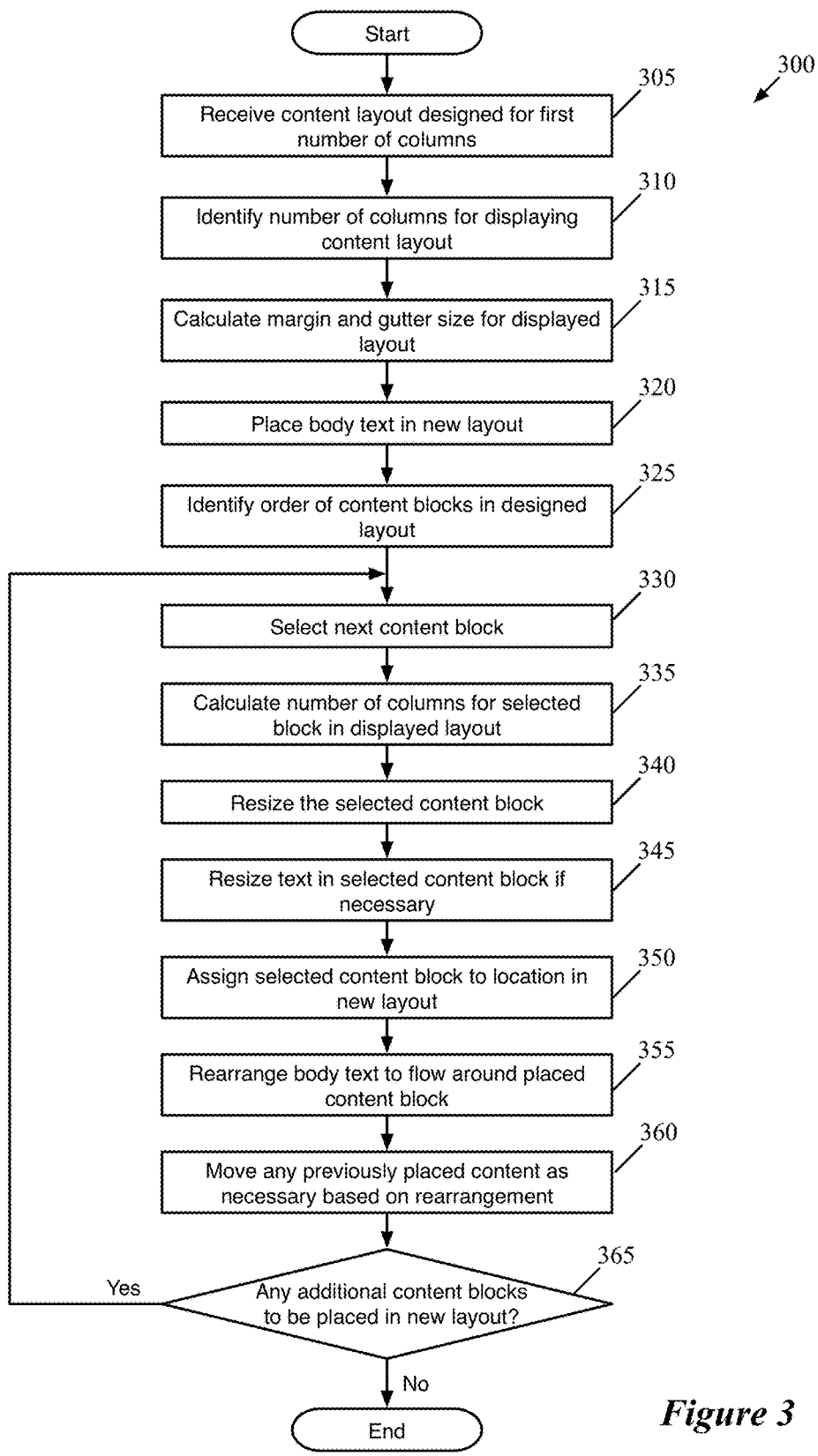
FIG. 3 conceptually illustrates a process of some embodiments for performing content layout rearrangement.

As mentioned above, some embodiments rearrange a content layout designed with a first number of columns for display on a particular device and orientation that uses a second, different number of columns. FIG. 3 conceptually illustrates a process 300 of some embodiments for performing such content layout rearrangement. This rearrangement process may be performed by a device used by the layout designer in order to determine how her content layout may look when viewed by an end user on a particular device in a particular orientation. The rearrangement process of some embodiments may also be performed by the end user device in order to display the content layout for viewing by the end user. This process may be performed by an application (e.g., a content creation application at the design side or a content viewing application at an end user device) in some embodiments. In other embodiments, the process 300 is an operating system process (which may be called by an application). The process 300 will be described by reference to a number of examples, shown in FIGS. 4-11.

As shown, the process begins by receiving (at 305) a content layout designed for a first number of columns (layout sections). Content layouts may be layouts for a page, section, etc. of an electronic book, a page or article from an electronic magazine (depending on whether the magazine is laid out in terms of pages or articles), a web page, a slide from a slide presentation, a PDF document, etc. The content layout might be received by an end user device or by a process operating on the device used by the designer to create the layout (so that the designer can view the layout as it will appear to an end-user on a different device). In some embodiments, the content layout is received as a set of content blocks arranged in a particular manner, along with the requisite data defining the content blocks, such as images, vector data describing vector graphics, text (and associated formatting), etc.). The description of each content block identifies the number of columns spanned by the content block in some embodiments. Furthermore, the content layout also includes metadata specifying the number of columns used when designing the layout, as well as the size of the margins and gutters in the originally-defined layout in some embodiments.

The process then identifies (at 305) a number of columns for displaying the rearranged content layout. On an end-user device, this might depend on the current orientation of the device. For example, rectangular (non-square) mobile devices such as most smart phones or tablets may display content layouts using different numbers of columns depending on whether the device is in its portrait or landscape orientation. For example, many smart phones will use two, three, or four columns in landscape orientation, and one or two column in portrait orientation. Some embodiments differentiate between symmetric layouts (designed using an even number of columns) and asymmetric layouts (designed using an odd number of columns). Specifically, some embodiments use an even number of columns (or a single column) for reduced (or expanded) symmetric layouts and use an odd number of columns for reduced (or expanded) asymmetric layouts. In some embodiments, as described in further detail in the U.S. Provisional Patent Application 62/172,129, filed Jun. 7, 2015, as well as the concurrently filed U.S. patent application Ser. No. 14/866,943, both of which are incorporated herein by reference, the number of columns is dependent on the gutter and margin sizes, and is calculated dynamically for each layout.

Next, the process 300 calculates (at 315) the margin and gutter widths for the displayed layout. Some embodiments take the width of the gutters in the designed layout (e.g., as a number of pixels) and multiply this by the ratio of the total number of sections in the new layout to the number of sections in the original layout. Thus, for a five-section layout generated from a seven-section layout, the gutter width is the original gutter width in the seven-section layout multiplied by 5/7.

Figure 4:
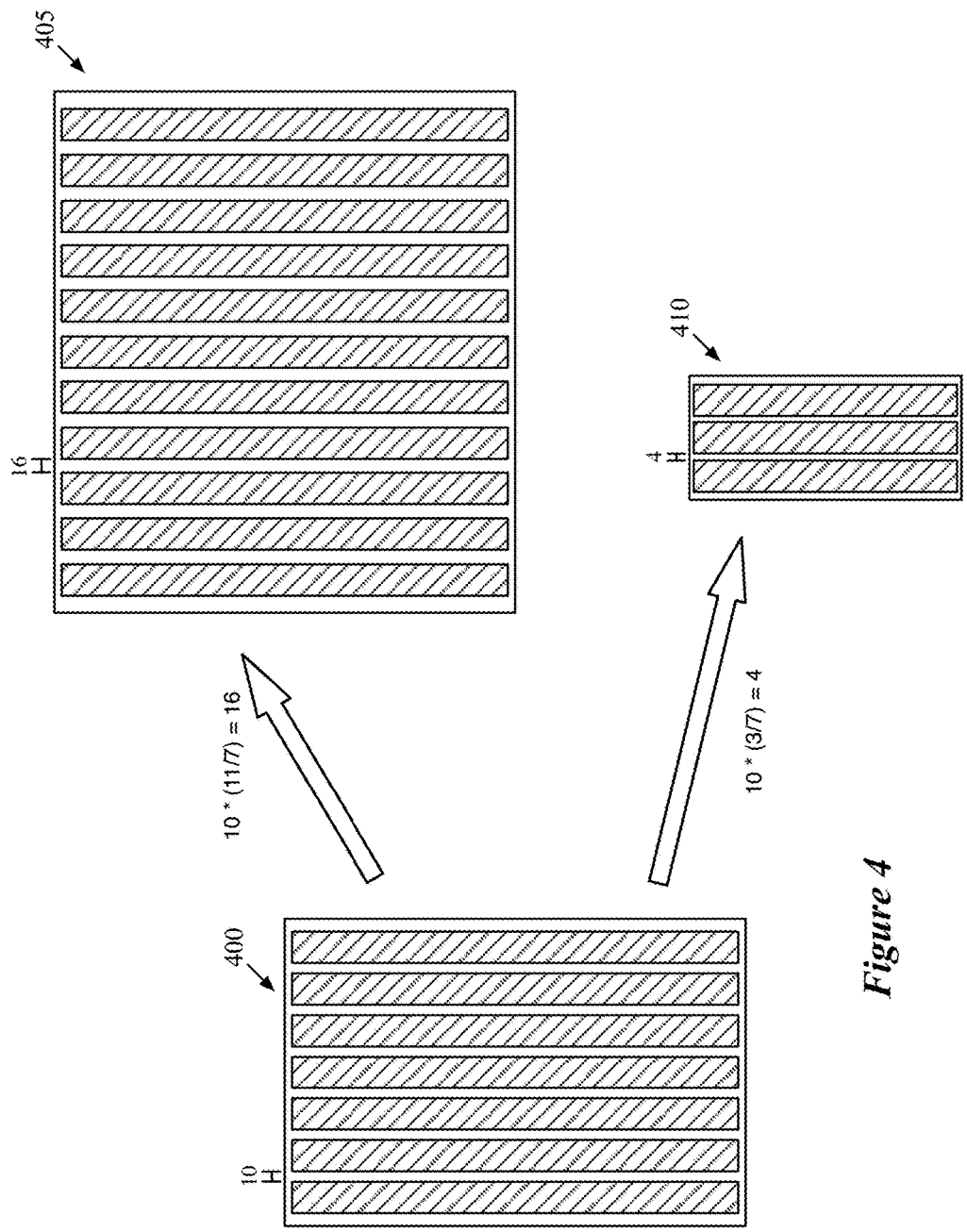
FIG. 4 illustrates an example of gutter widths changing between layouts having different numbers of columns.

FIG. 4 illustrates an example of gutter widths changing between layouts having different numbers of columns. Specifically, this figure illustrates an original layout 400 having seven columns and a gutter width of 10 pixels as translated into (i) a layout 405 having 11 columns and (ii) a layout 410 having 3 columns. As indicated by this figure, the layout 405 has a gutter width of 16 pixels between columns (10*11/7=15.7), and the layout 410 has a gutter width of 4 pixels between columns (10*3/7=4.3). While this figure illustrates the columns as having the same width for each of the three layouts 400-410, this may not always be the case. In some embodiments, the number of columns for a particular device and orientation is fixed (so long as the gutters and margins are within thresholds), and the column widths therefore change with the gutter and margin widths.

However, in some embodiments, the number of columns for a particular device and orientation are designed to keep the column width as close as possible between devices. Some embodiments, as described in the above-incorporated U.S. Provisional Patent Application 62/172,129 and the concurrently filed U.S. patent application Ser. No. 14/866,943, calculate the margin and gutter sizes prior to calculating the number of columns. Specifically, some such embodiments keep the gutter width a constant number of pixels irrespective of the size of the device on which the layout will be displayed. However, the margins are reduced in size so as to occupy a constant percentage of the display width. Thus, margins that are 60 pixels wide in a 1024-pixel design will be reduced to 38 pixels in a 640-pixel width display (60*640/1024). The device displaying the layout then determines the number of columns (accounting for gutter width) that can fully fit within the display width, and uses that number of columns for the layout (sizing the columns up to fill the width between the margins).

Irrespective of how the columns and gutters are determined, the process 300 next places (320) any body text in the new layout. Whereas the other content blocks are scaled according to aspect ratio, body text of a layout flows around the other content blocks as they are placed within the layout. Thus, the initial placement of body text in some embodiments assumes that the text flows through the entire layout (using as many lines as necessary given the width of the layout) from left to right and then top to bottom. As will be described below, the body text is treated as content of the layout as a whole, while in some embodiments each content block may have its own body text that flows freely within the content block (and flows around other content blocks nested inside that content block).

In some embodiments, the application also sizes the text when placing the body text in the layout. In some embodiments, the text size is scaled by using a multiplier based on the ratio of columns in the original and new layouts. However, simply multiplying the font size by this ratio will often result in too drastic a change. A title displayed in 70-point font in a seven-column layout should not generally be shrunk to 10 point font for a one-column layout (as the body text will not normally be made smaller than 10 point font, for readability). Instead, some embodiments use a multiplier that is a function of the number of columns, but does not decrease to zero for the hypothetical zero-column layout. For example, some embodiments use a function $m=C_1 x+C_2$, where m is the multiplier value, x is the number of sections, and $C_1$ and $C_2$ are constants (e.g., m=0.0263x+ 0.816). For the body text, some embodiments do not actually use such a multiplier, and instead use a default size for different devices and/or orientations. For instance, a smart phone might use 10 point font in either orientation, while a tablet uses 12 point font. Some embodiments use a constant body text font size for each different device/orientation combination, but use the multiplier to calculate the x-height for the text.

Next, before resizing and placing the content blocks in the new layout for display, the process 300 identifies (at 325) the order of the content blocks in the designed layout. In some embodiments, this order is based on a left-to-right and then top-to-bottom order of the content blocks. For example, in the layout 100 of FIG. 1, the content blocks would be ordered with block A 145 first, then block B 150, block C 155, and block D 160. However, some embodiments may modify this order if content blocks are connected to each other. As described below, some embodiments automatically connect content blocks in addition to allowing manual connection of the blocks, and connected blocks may be placed next to each other in the order even if this violates a strict left-to-right then top-to-bottom order. For instance, if layout 100 included a fifth content block directly underneath block C 155 that was connected to block C 155 (e.g., a caption to block C's image), then this content block would be moved up in the order to directly follow block C 155, rather than being after block D 160.

The process then selects (at 330) the next one of the content blocks. In some embodiments, the process uses the order for the content blocks identified at 325. The first time through the operations 330-360, this will be the first content block in the order. Other embodiments may select the content blocks in various different orders (e.g., bottom to top, right to left, etc.).

The process 300 then begins placing the selected content block in the new layout for display. Specifically, the process calculates (at 335) the number of columns of the displayed layout that the selected content block will span, and resizes (at 340) the selected content block. Some embodiments then resize each of the content blocks from the original layout. To perform such resizing, some embodiments multiply the number of columns spanned by the content block in the original layout by the ratio of the total number of sections in the new layout to the total number of sections in the old layout, then round to the nearest integer (or up to 1 if the result is less than 0.5). For instance, a content block spanning four sections out of nine will be resized to one block in a three section layout (4*(3/9)=1.3). The content block is also resized vertically to maintain its aspect ratio, in some embodiments.

Figure 5:
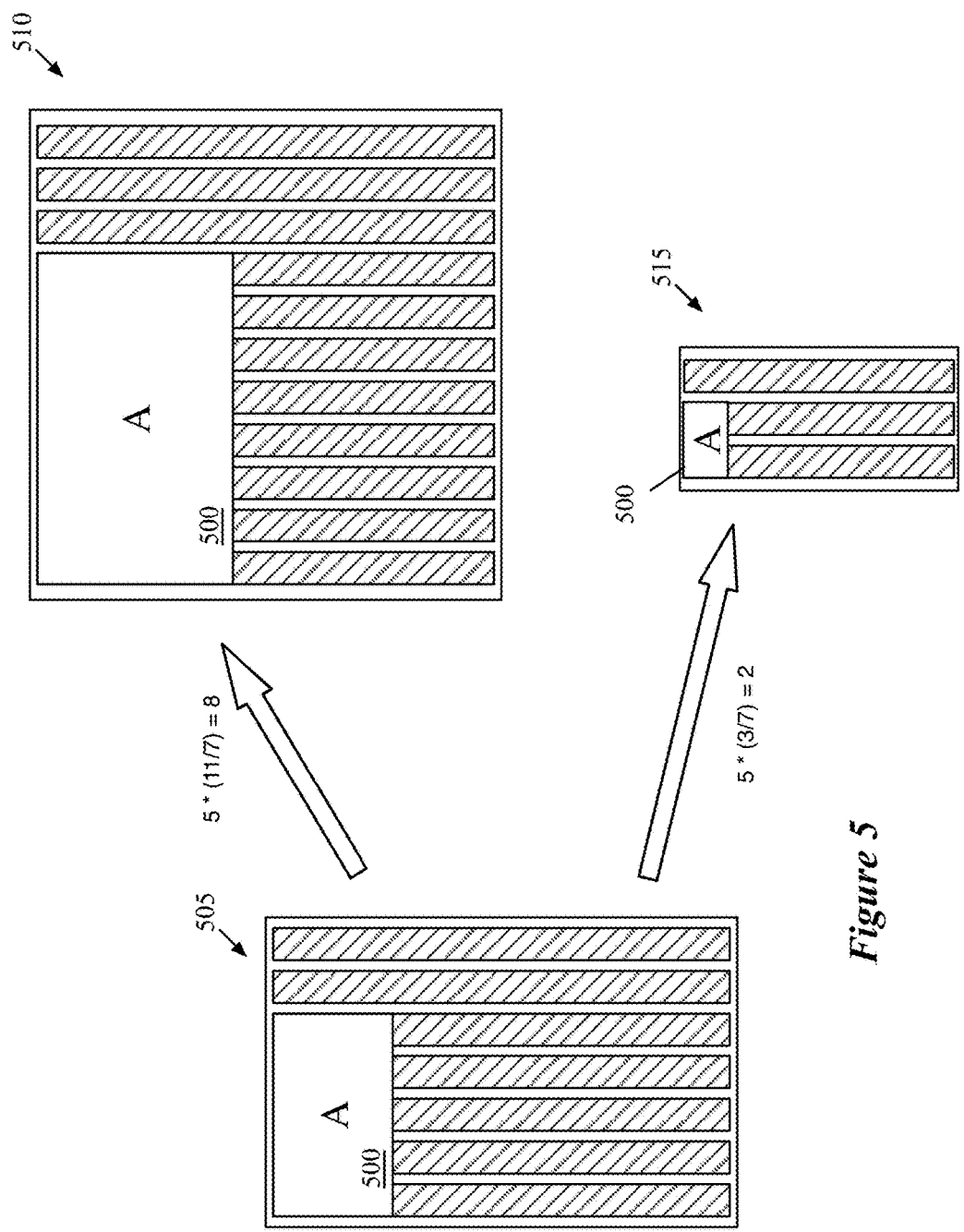
FIG. 5 illustrates an example of resizing of a content block in a designed seven-column layout, for an eleven-column layout and a three-column layout.

FIG. 5 illustrates an example of such resizing of a content block 500 in a designed seven-column layout 505. This figure illustrates the resizing of the content block 500 for an eleven-column layout 510 and a three-column layout 515. To display the content block in the eleven-column layout, the process calculates the number of columns spanned by the content block 500 in the new layout as the five columns spanned in the designed seven-column layout multiplied by the ratio of eleven columns to seven columns, arriving at 7.9 (which rounds to an integer value of eight columns). The process also resizes the content block 500 for the layout 510 by expanding the block to span the eight columns while maintaining the aspect ratio of the content block. This may not be simply multiplying each of the dimensions by 8/5 (the number of columns spanned in the new/original layouts), as the gutter width and column width (in pixels) may have an effect. Similarly, for the layout 515, the process calculates the number of columns (five columns multiplied by the ratio of three new columns to seven original columns) as 2.1, which rounds to two columns. Again, the aspect ratio of the content block 500 is maintained for the three-column layout 515.

Some embodiments allow the author to impose certain additional restrictions on the resizing of a content block. For instance, the author might want a particular detailed image to always be displayed using at least two columns. Thus, even if the calculation using the column ratio would resize the image to one column, the process scales the image back up to two columns (except for a one-column display). In some embodiments, the author can also have certain content blocks ignore the margins, and thereby extend to either the left or right edges of the display (or both).

In some embodiments, when the layout is resized down to a single column, some embodiments will use smaller sub-columns to resize content blocks. These sub-columns are not applied to the body text in some such embodiments (which always spans the full width of the single-column display. However, for other content blocks, the sub-columns are used (e.g., the same number of sub-columns as full columns that were used in the original layout) to prevent content blocks that spanned only a portion of the width of the original layout from spanning the whole of the one-column layout.

The process 300 also resizes (at 345) text within the selected content block if necessary. Some embodiments only resize certain text (e.g., when necessary to fit within a resized content block, or if the content block is marked as a specific type of content, such as a title). For example, certain text might be resized so as to not look excessively large compared to images that have been shrunk down to fit in a smaller number of layout sections, or excessively small when a layout is expanded for viewing on a larger device (e.g., a television or full-screen view of a large monitor). However, simply multiplying the font size by the ratio of number of sections between the original and display layouts will often result in too drastic a change. A title displayed in 70-point font in a seven-section layout should generally not be shrunk to 10 point font for a one-section layout. Instead, some embodiments use a multiplier that is a function of the number of columns, but does not decrease to zero for the hypothetical zero-column layout (e.g., $m=C_1 x+C_2$, where m is the multiplier value applied to the font size, x is the number of sections, and $C_1$ and $C_2$ are positive constants between 0 and 1). As one example, when a layout is designed with seven columns, some embodiments use a function in which m=0.083x+0.419. When x=7, the multiplier m=1, as should be a feature of any such equation for layouts designed with a specific number of columns.

Resizing the text may also include modifying the line height for the text in some embodiments. The line height does not define the display of the individual characters, but instead defines how much space is between each line of text. Some embodiments use a function for calculating the line height that modifies the line height based on the line length, at least in part. Specifically, some embodiments use a function $H=Fx(r-(1/(2r))(1-W/(Fr)^2))$, in which H is the calculated line height, F is the font size, x is a function strength determined by either the author of the layout or the user of the device on which the layout is displayed, r is the golden ratio 1.618 . . . , and W is the line length (or width). Thus, the line height scales up with the font size as well as with the line width, so that narrower text (e.g., text fit into fewer columns) will have the text more compressed vertically for better readability.

Next, the process assigns (at 350) the selected content block to a location in the new layout. Some embodiments use various rules to link content blocks together or align the blocks with each other or anchor the content blocks to a particular portion of body text. For example, some embodiments relate each other content block to the first word of body text in the layout, then place the content blocks where space is sufficient in order to best preserve the relation in the new layout, after resizing the content blocks as described above. The method preserves the order of the content blocks, using a left-to-right then top-to-bottom order. However, the designer of the content layout may also align content blocks to other words in the body text, in order to link items to their related text. As the text moves (either due to addition/deletion of text, or resizing for a new layout), the content blocks are moved with the text to which they are linked as much as possible while respecting other content blocks prior to them in the order that are already placed.

Figure 6:
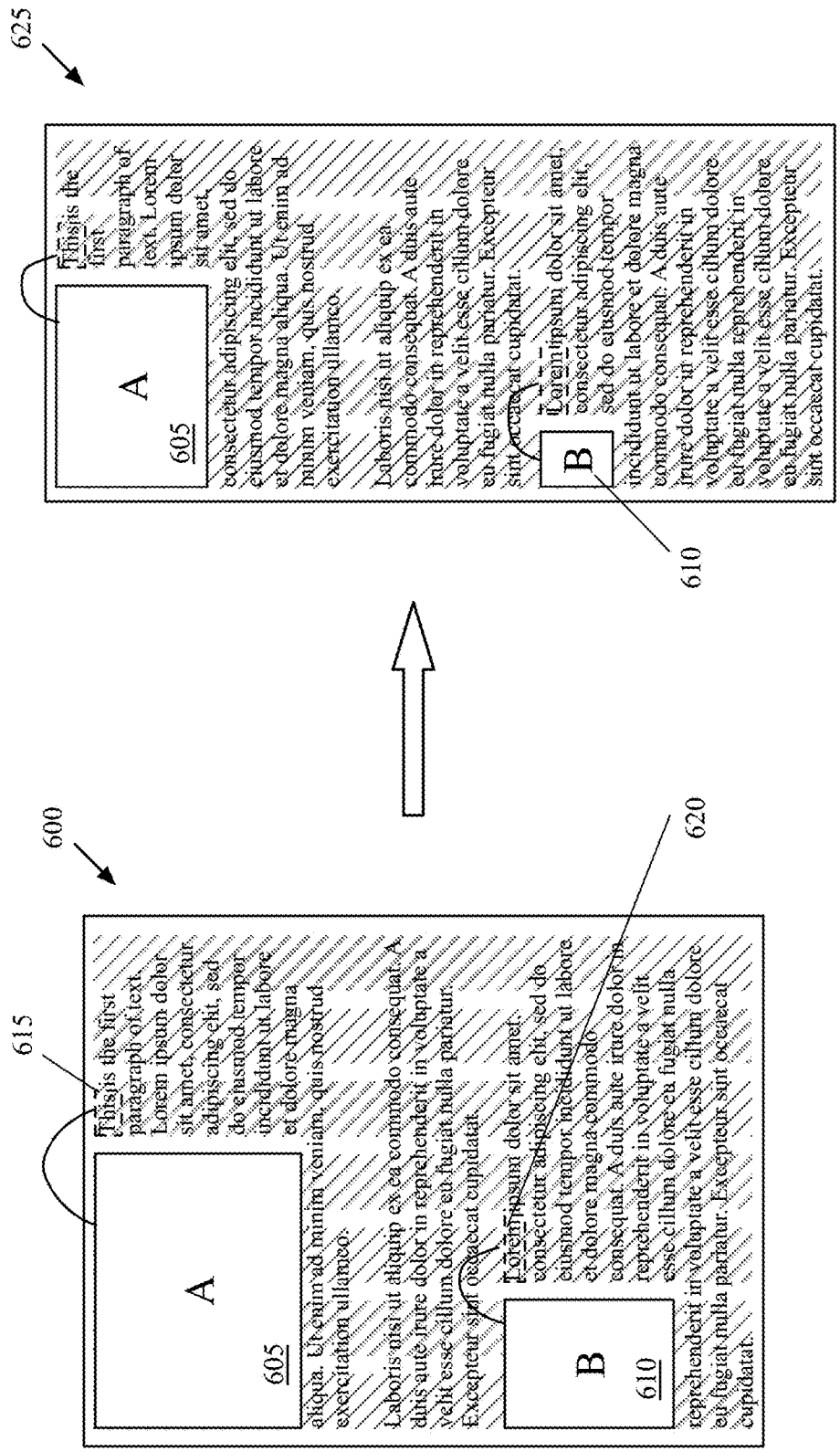
FIG. 6 illustrates the linking of content blocks to specific words in the body text of a layout.

FIG. 6 illustrates the linking of content blocks 605 and 610 to specific words in the body text of a layout 600. Specifically, the first content block 605 is linked automatically to the first word 615 of the body text ("This"), while the second content block 610 has been linked (by user action) to the first word 620 of the third paragraph of the body text. As shown, the body text flows around these two content blocks within the layout 600, spanning all seven columns where possible. When converted to a five-column layout 625 (on the right side of the diagram), the first content block 605 spans three columns and the second content block 610 spans one column. As shown, in the layout 625, the first content block remains in the top left corner of the layout, as its top is aligned to the first word 615 of the body text, and the layout conversion process preserves the left alignment from the original layout 600. In addition, the second content block 610 has been pushed further down the layout, because only having five columns (rather than seven) means that the body text requires more lines of text (unless a smaller font size is used). The second content block 610 remains aligned with the word 620 at the start of the third paragraph of the text, even though this means that the relative distance between the blocks 605 and 610 has increased.

In addition to or instead of alignment with body text, some embodiments allow (and may automatically create) anchoring of content blocks to each other. For instance, some embodiments automatically align content blocks to the nearest other content block. If the nearest content block is the body text, then some embodiments align the content block to the closest word to the top of the content block.

Figure 7:
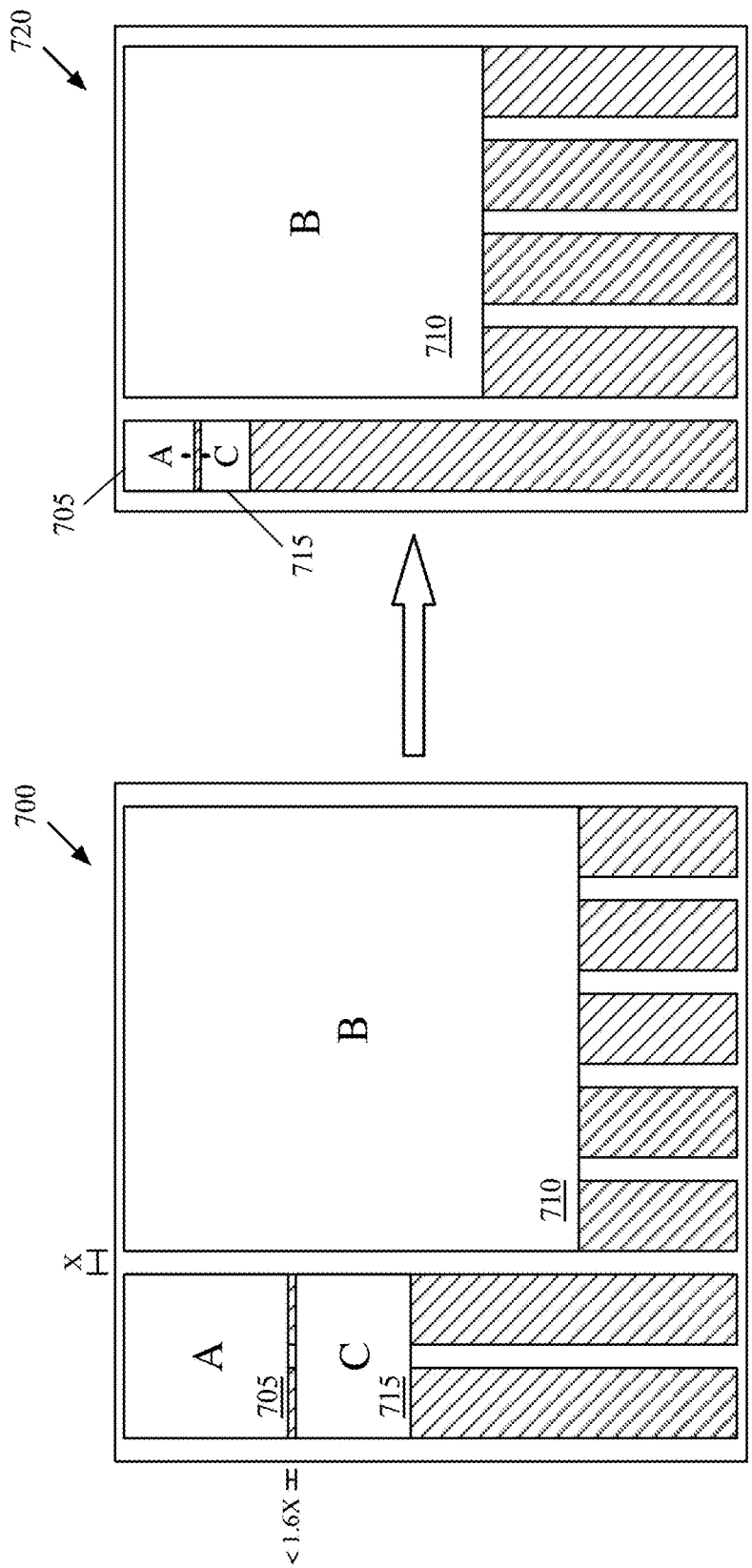
FIGS. 7 and 8 illustrate the use of the width of the gutters as a basis for determining to which other content block a first content block should be aligned or anchored.
Figure 8:
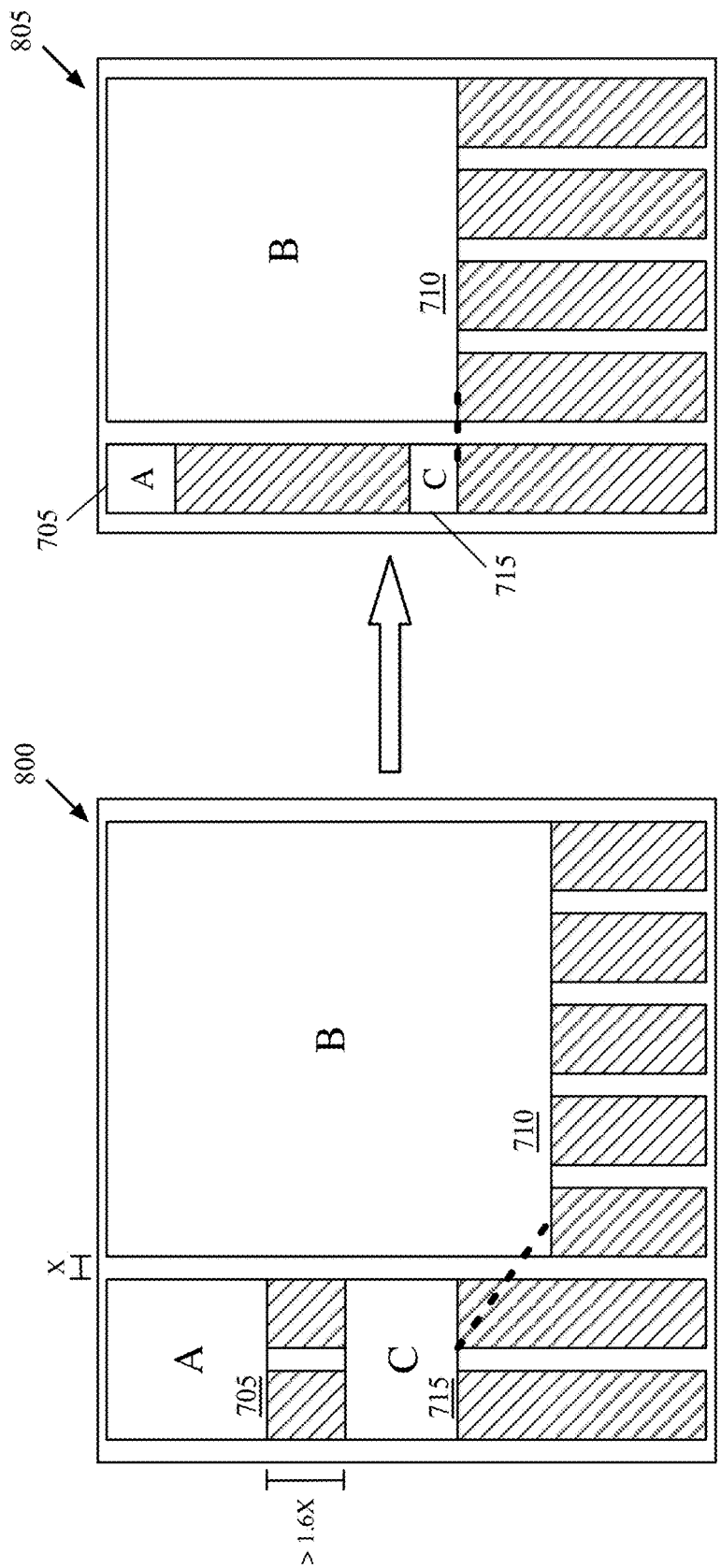

FIGS. 7 and 8 illustrate that some embodiments use the width of the gutters as a basis for determining to which other content block a first content block should be aligned or anchored. Specifically, some embodiments use vertical anchoring when the vertical distance between two content blocks is less than a particular multiple of the gutter width (e.g., 1× the gutter width, 1.6× the gutter width, 2.5× the gutter width, etc.). In this example, the particular multiple is 1.6× the width of the gutters.

FIG. 7 illustrates three content blocks 705-715 in a seven-column layout 700. In this example, the first content block 705 spans two columns in the top left corner of the layout and the second content block 710 spans five columns in the top right corner. The third content block 715 is located directly underneath the first content block 705 and next to the second content block 710. As shown in the figure, the vertical distance between the bottom of the first content block 705 and the top of the third content block 715 is less than 1.6× the width of the gutter (which is also the horizontal distance between the second content block 710 and the third content block 715). Thus, when converted to a five-column layout 720, the third content block 715 remains anchored to the first content block 705, staying directly underneath the first content block 705 in the leftmost of the five columns.

FIG. 8 illustrates the same three content blocks 705-715 in a different seven-column layout 800. In this example, the third content block 715 is located significantly lower in the left two columns, well below the first content block 705 with more than 1.6× the gutter width of vertical distance between the two content blocks. As such, the third content block 715 is automatically aligned to the second content block 710, which it is close to horizontally. To find an anchor/alignment point, some embodiments anchor the bottom of the third content block 715 to the bottom of the second content block 710, as shown by the dashed line. While this does not mean that the third content block is moved in the seven-column layout 800 as designed, when converted to a five-column layout 805, the third content block 715 is placed down lower such that its bottom edge aligns with that of the second content block 710.

Some embodiments align the bottom (or top) edges of two content blocks that are next to each other only when the fixed content block (i.e., the second content block 710, fixed in the top right corner in the example) does not have any discernible anchor points within its content. For instance, a raster image would not have any such discernible anchor points. On the other hand, if the content block includes its own body text, then some embodiments anchor neighboring content blocks to words or lines of the body text. In the example of FIG. 8, some embodiments would align the top of the third content block 715 with a line of the body text of the second content block. In this case, the second content block would be located vertically with the same portion of text in the five-column layout 805.

Figure 9:
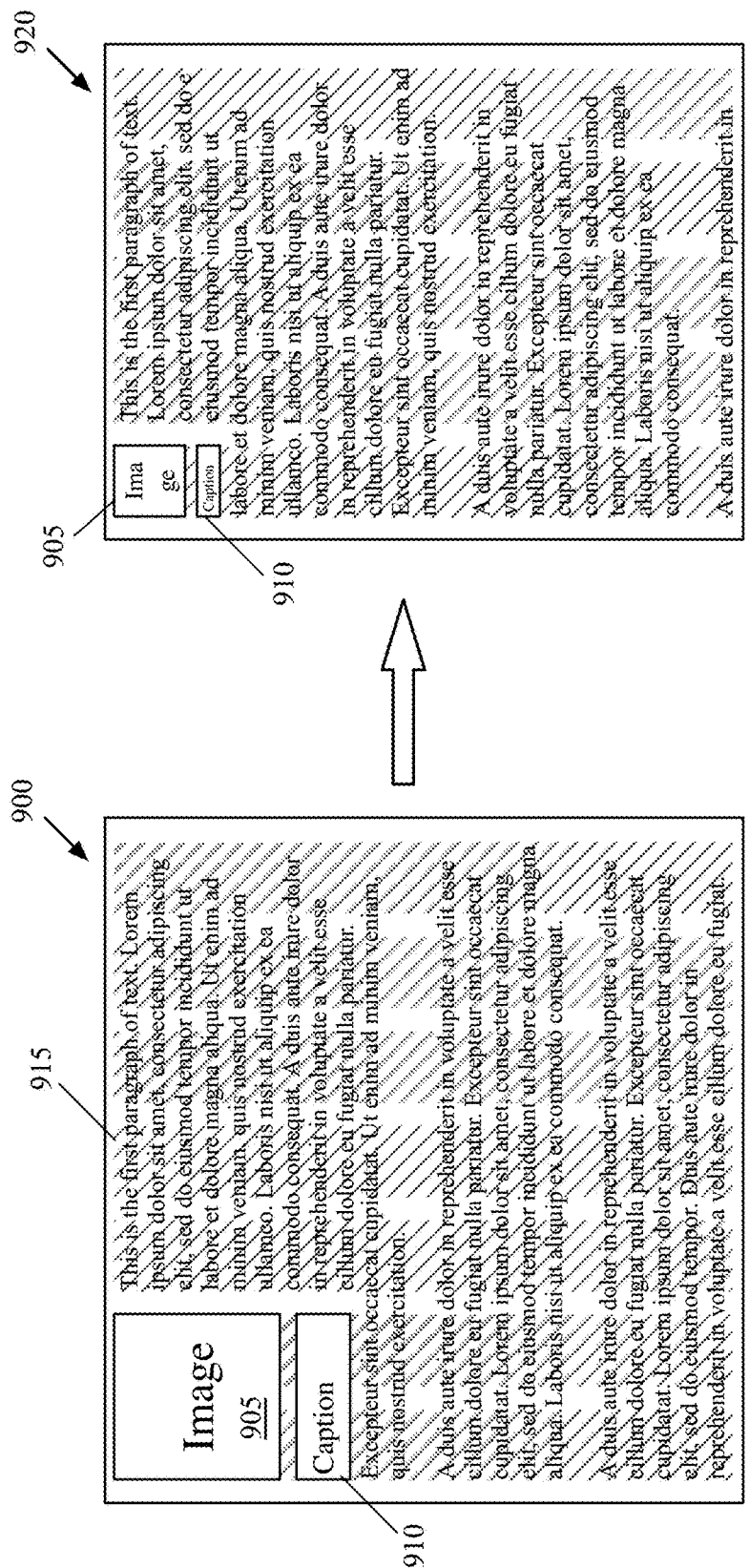
FIG. 9 illustrates a seven-column layout that includes an image with a caption, as well as body text that flows around these two content blocks.
Figure 10:
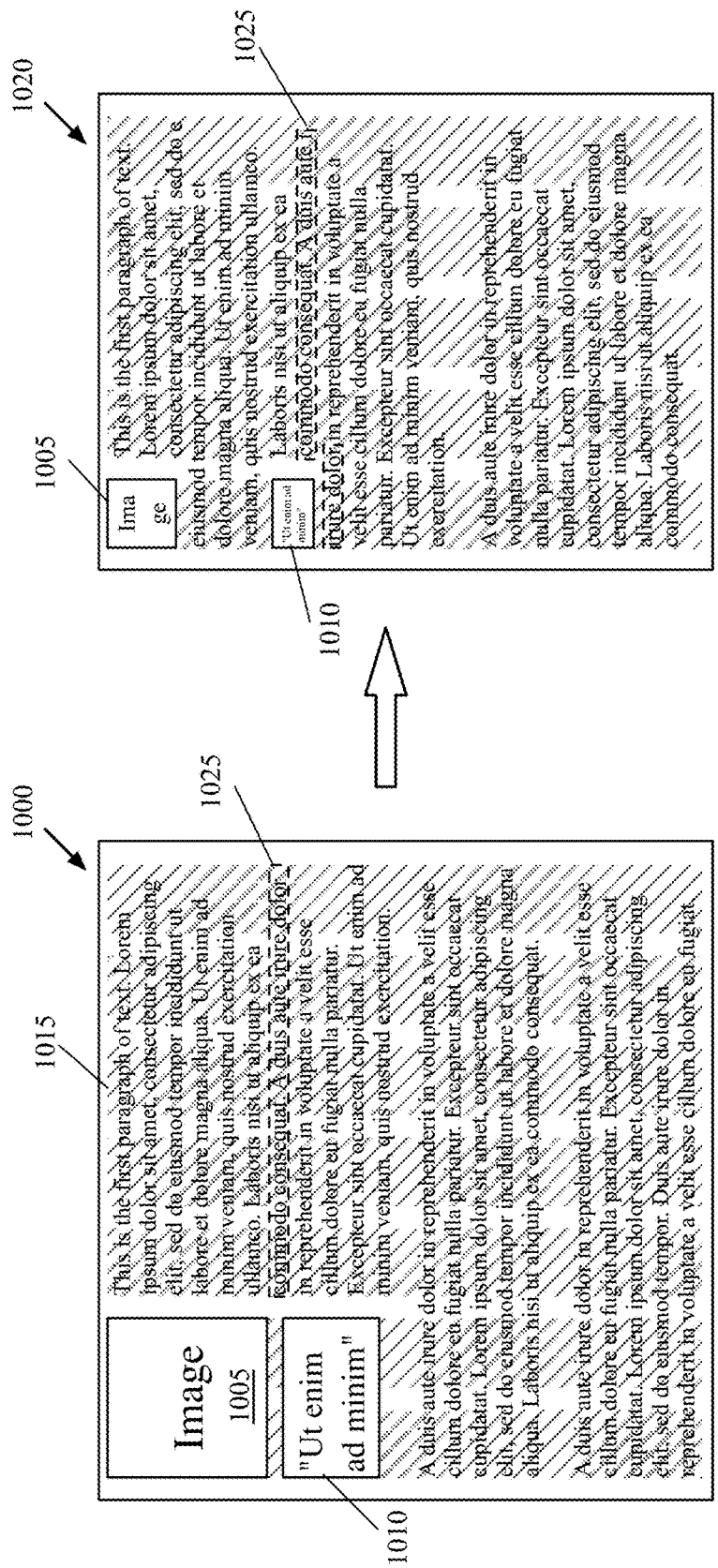
FIG. 10 illustrates a seven-column layout with an image and a pull quote (also referred to as a call-out quote), around which body text flows.

Furthermore, some embodiments use the type of content block to make a decision about alignment. As an example, a content block labeled as a caption will be linked to an image if an image is nearby, even if another content block is closer. On the other hand, a content block labeled as a pull quote will be linked to the nearest body text, even if an image is closer. FIGS. 9 and 10 illustrate examples of the content block type being used to determine the location of content blocks in rearranged layouts.

FIG. 9 illustrates a seven-column layout 900 that includes an image 905 with a caption 910, as well as body text 915 that flows around these two content blocks. In some embodiments, layout design automatically anchors the caption 910 to the image 905 because the caption is within a certain distance of the image and aligned directly underneath the image. Some embodiments also align captions with images when the caption is located directly above the image, or similarly located in a position that indicates likely relation. As such, when converted to a five-column layout 920, the rearrangement process automatically keeps the caption 910 located directly underneath the image 905 (with the body text flowing around the two content blocks).

FIG. 10 illustrates a seven-column layout 1000 with an image 1005 and a pull quote (also referred to as a call-out quote) 1010, around which body text 1015 flows. In both this example and the above example of FIG. 9, the layout designer creates the content blocks using a tool that allows the designer to designate each content block with a label that indicates its type. The layout 1000 is arranged in essentially the same manner as that of the layout 900, with the content block 1010 (the pull quote) located directly underneath the image 1005. However, as shown by the five-column layout 1020 generated from the seven-column layout 1000, the rearrangement process does not keep the image 1005 and the pull quote 1010 together in some embodiments. Instead, some embodiments anchor the pull quote to the nearest line of body text, or perform an analysis of the text to identify the text of the pull quote in the body text and anchor the pull quote to its corresponding body text. In this case, the pull quote 1010 is anchored to a line of text 1025 in the seven-column layout.

In the five-column layout, the pull quote 1010 (now only one column wide, and using a smaller font) is aligned near the same portion of body text. Because the body text spans fewer columns, the lines of text will not correspond exactly between layouts (unless the body text font is reduced equivalently). As such, some embodiments lay out the body text without the content block that aligns to the body text (e.g., the pull quote 1010) and then place the content block based on that layout. As noted below, the placement of the content block may cause the text to which it is aligned to move to a different text line, but it will still be located nearby. In this case, the first word of the text line ("commodo") is moved down one line as a result of the placement of the pull quote 1010. However, the pull quote is nevertheless located near to the same text line. In addition, as a result of the modification of the layout 1000 for five columns, the pull quote 1010 is now separated from the image 1005 by intervening text. If the designer wants the pull quote to stay with the image, some embodiments provide tools for manually anchoring the two content blocks together, which would override the automatic type-based anchoring.

As another example, text blocks (e.g., a pull quote, caption, or other block of text) may be aligned with a nearby content block based on the alignment of the text within its block. Thus, for instance, a text block with content blocks directly on either side will be aligned to the content block to its left if the text is left-aligned and to the content block to its right if the text is right-aligned. If the text is center-aligned or justified (both right- and left-aligned) between two non-text content blocks, some embodiments use the reading direction to align the text block. Thus, for left-to-right reading (e.g., English), the text block is aligned to the content block directly to its left.

Returning to FIG. 3, after assigning the current resized content block to a location in the new layout for display, the process rearranges (at 355) the body text of the layout to flow around the newly placed content block. In some embodiments, as mentioned, body text is not treated as a content block, but is rather the content within a block (the block in this case being, e.g., the entire layout) that flows around any content blocks defined within the block. When possible, the body text spans the entire width of the layout; however, as content blocks are added to the layout, the body text is rearranged to flow around those content blocks, potentially adding text lines to the layout.

Figure 11:
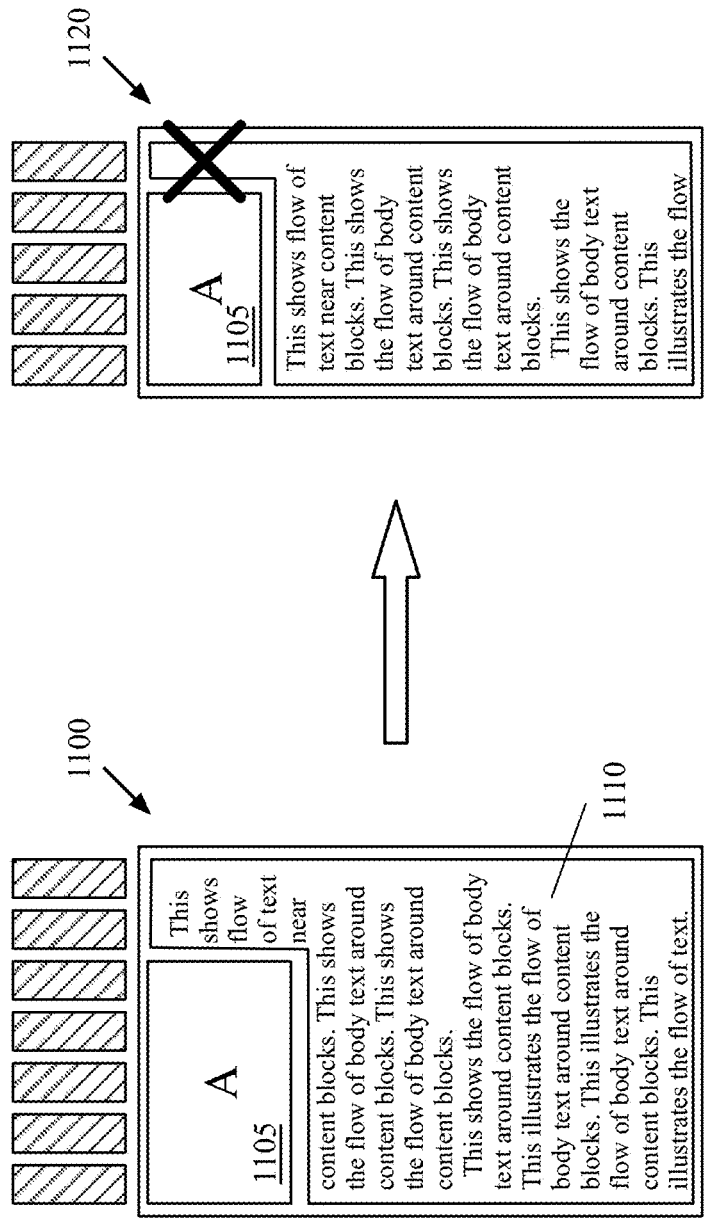
FIG. 11 illustrates an example in which the space left for body text at certain portions of a layout spans only a single column.

When one or more content blocks occupy a subset of the columns of a layout at a particular height, the body text only spans the unoccupied columns at that height. However, some embodiments do not fill in body text when only one column remains between two content blocks or between the content blocks and the edge of the layout (except in the case of a one-column layout, of course). FIG. 11 illustrates an example of such a situation, in which the space left for body text at certain portions of a layout spans only a single column. Specifically, this figure shows a seven-column layout 1100 (the columns are shown above the layout for simplicity in viewing the layout) with a content block 1105 that spans five columns. The body text 1110 wraps around this content block 1105, occupying two columns in the top portion of the layout 1100.

When the layout 1100 is converted to a five-column layout 1120, the content block 1105 spans four of the five columns, leaving only the rightmost column for body text. However, as shown in the figure, the body text begins underneath the content block 1105 in the five-column layout, rather than filling in the lone column next to the content block. In addition, the same feature applies to the seven-column layout as designed: if the designer expands the content block 1105 to fill a sixth column, then the body text will begin underneath the content block in the seven-column layout as well. Some embodiments enable the layout designer to disable this feature, thereby allowing the body text to flow through single columns. In addition, or as an alternative, some embodiments automatically expand a content block to fill a single column, so as to avoid undesired blank space. In the example shown, such embodiments would expand the content block 1105 to span all five columns in the layout 1120. Similarly, when a blank column is created between two content blocks, some embodiments automatically expand one of the content blocks (e.g., the smaller of the two, or whichever of the content blocks (if either) was reduced more from its original size) to fill the space between the two blocks.

Figure 12:
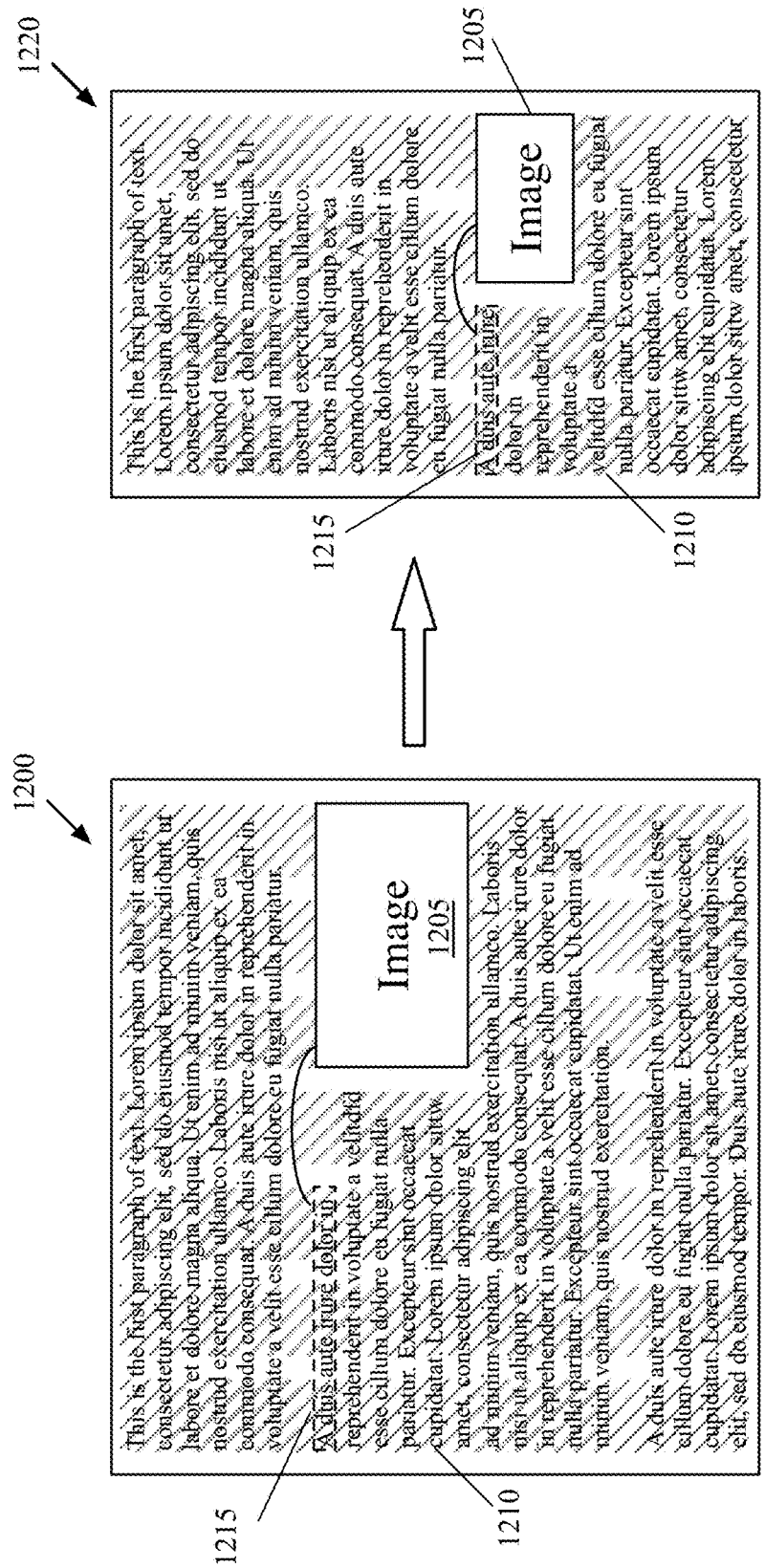
FIG. 12 conceptually illustrates an example of a content block in a seven-column layout that is re-arranged to a four-column layout.

In some embodiments, as described above, content blocks may be anchored to specific portions of the body text, and these content blocks will stay with the body text as the blocks are resized and the text is rearranged. FIG. 12 conceptually illustrates an example of a content block 1205 in a seven-column layout 1200 that is re-arranged to a four-column layout 1220. In this case, the top of the content block is anchored to a specific portion 1210 of the text (i.e., the first line of the second paragraph 1215).

When the content block 1205 is assigned to a location in the new layout (e.g., at operation 350), the content block is located so that its top is still aligned with the same specific portion 1210 of the text (the first line of the second paragraph 1215). In addition, the text of the paragraph 1215 now wraps around the image (e.g., according to operation 355), which stays aligned to the same portion 1210 of the body text.

As mentioned above, for single-column layouts, some embodiments resize certain non-body-text content blocks down to less than one column. To determine whether to have body text flow around these content blocks or skip the horizontal section left blank by the resized content blocks, some embodiments determine whether enough body text will fit in the blank section. For instance, if several subsequent lines will have only one word of body text, some embodiments skip placing body text in that section. Other embodiments use the font size and determine whether a certain number of equal-width characters in the font size will fit within the section.

After rearranging the body text, the process 300 also moves (at 360) any previously placed content blocks as necessary based on the rearrangement of the body text in some embodiments. Specifically, if any of the previously placed content blocks are anchored to body text that moves as a result of the placement of the currently selected content block, then those previously placed content blocks are moved along with the body text to which they are anchored. In other embodiments, content blocks that have been previously placed in the new layout for display are not moved, so as to avoid feedback loops of content blocks causing each other to move repeatedly.

In addition, some embodiments expand content blocks to fill any empty space in a layout caused by the resizing and alignment process. As an example, if a seven-column layout includes a first two-column content block arranged next to a second five-column content block, when that layout is resized down to a two-column layout, the first content block will be sized to one column and the second content block will be sized to one column. As the second content block will then be placed underneath (rather than next to) the first content block in the two-column layout, some embodiments expand the first content block to fill the empty space (with the content block expanded horizontally and vertically, so as to maintain its aspect ratio.

Finally, the process 300 determines (at 365) whether any additional content blocks remain to be placed in the new layout. That is, the process determines whether all of the content blocks received as part of the designed layout have been resized and located in the new layout. When additional content blocks remain, the process returns to operation 330 to select the next content block, which is then resized and placed. After placing all of the content blocks in the new layout, the process ends.

The process 300 is shown for a single-tiered layout, in which all of the content blocks belong to the layout as a whole. However, some embodiments allow nested layouts, in which some or all of the content blocks in the primary layout include one or more sub-blocks. In such cases, each of the content blocks in the primary layout is treated as its own layout, with similar operations to resize and place their internal content blocks. In the example of FIG. 5, if the content block 500 had several sub-blocks, the block 500 would be treated as going from a five-column layout to either an eight-column layout or a two-column layout, with the sub-blocks resized and located accordingly.

II. Content Generation Application

The above sections describe in detail a process for rearranging a layout for display. As mentioned, this process may be performed by an application used by a content author to design the layout (or may be an operating system process called by such an application), such as a word processor, electronic book and/or magazine authoring application, a slide presentation application, etc. The process may also be performed by an application used by an end consumer of the content to view the content (or may be an operating system process called by such an application), such as a PDF viewer, an electronic book reader, etc.

Figure 13:
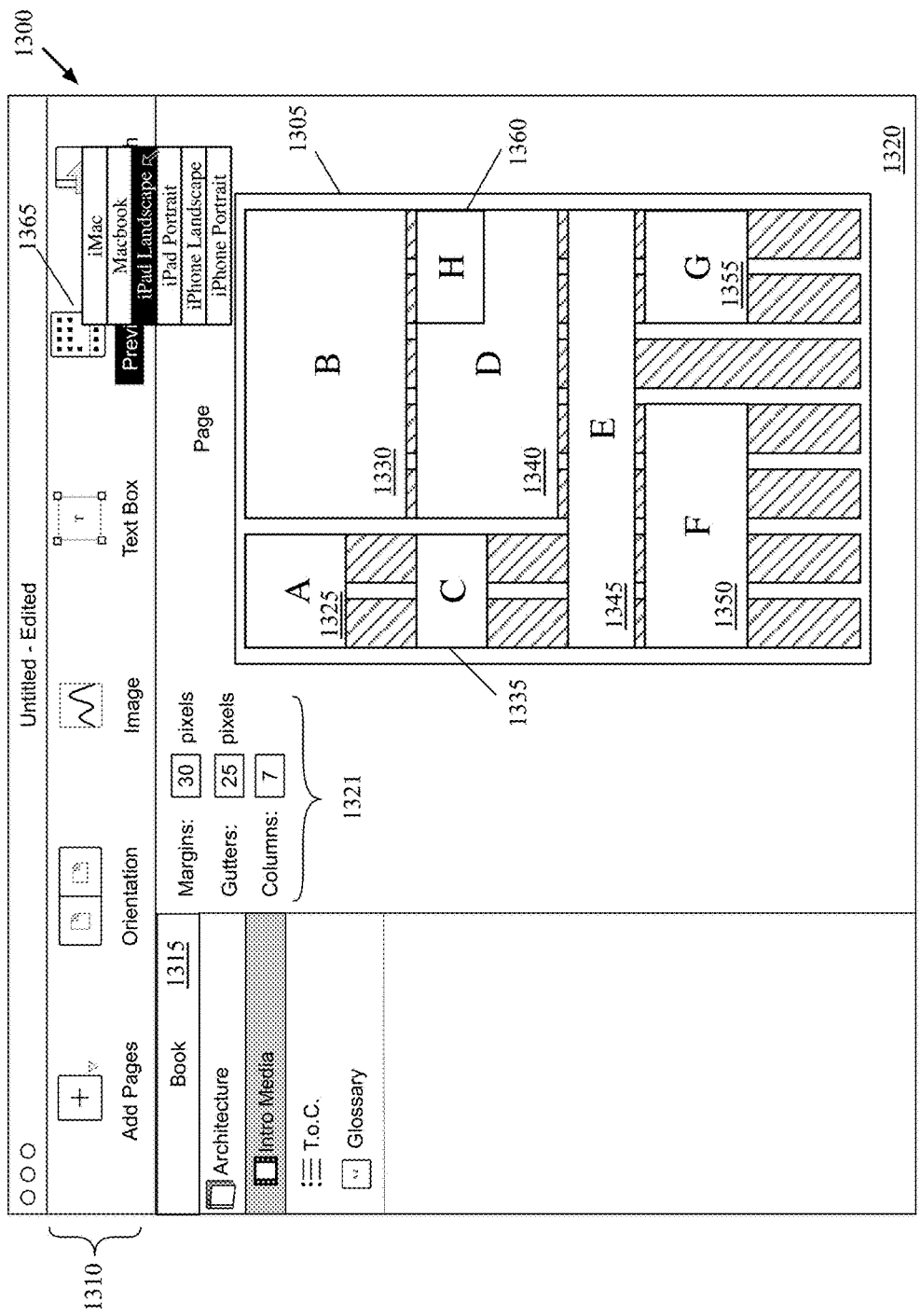
FIG. 13 illustrates an example of a layout that an author is designing in a graphical user interface (GUI) of an electronic book authoring application.

FIG. 13 illustrates an example of a layout 1305 that an author is designing in a graphical user interface (GUI) 1300 of an electronic book authoring application. Specifically, the layout 1305 is the layout for a page of an electronic book that the user is creating with the authoring application. As shown, the GUI 1300 includes a set of selectable GUI items 1310, including items to add pages to the current electronic document, modify the orientation of a page, add an image or text box to the layout, preview the layout, or publish the current book. One of ordinary skill would recognize that these are simply a few of the numerous possible UI tools that might be available to an author in such an application, with potentially many other UI tools available either via selectable icon, drop-down menu, etc. For example, some embodiments might provide options for changing the widths of the margins and/or gutters of a layout. The GUI 1300 also includes a document navigation section 1315, which allows the user to navigate the various pages and/or sections of an electronic book being authored.

In addition, the GUI 1300 includes a layout editing and viewing section 1320, in which the user is currently designing the layout 1305 for a page of an electronic book. The layout editing and viewing section 1320 includes layout settings 1321, which allow the user to set the margin width, gutter width, and number of columns. In this case, the margins are set to 30 pixels, gutters to 25 pixels, and the user has selected seven columns for the layout 1305.

The layout 1305 has seven columns and includes several content blocks 1325-1360 (with the last content block 1360 nested inside the fourth content block 1340). The first and third content blocks 1325 and 1335 each span the leftmost two columns, while the second content block 1330 and the fourth content block 1340 each span the other five columns. The fifth content block 1345 spans all seven columns, then the fourth content block 1350 spans the leftmost four columns and the seventh content block 1355 spans the rightmost two columns, with a one-column space between them. In addition, the eighth content block 1360 is nested within the fourth content block 1340, spanning two of the five columns.

In the example, the user has selected the preview UI item 1365, one of the selectable GUI items 1310. Selecting this item causes the application to display various selectable options for different devices and orientations upon which the electronic document might later be viewed, with selection of one of the options causing the application to perform the layout rearrangement process and display the layout as it would appear on the selected device and orientation. The various selectable devices and orientations display layouts using different numbers of columns in some embodiments. For example, in some embodiments, the options shown are in descending order of number of columns for display, from a desktop computer (iMac) to a laptop computer (MacBook) to a tablet (iPad) in both landscape and portrait orientations to a smartphone (iPhone) in both orientations.

Figure 14:
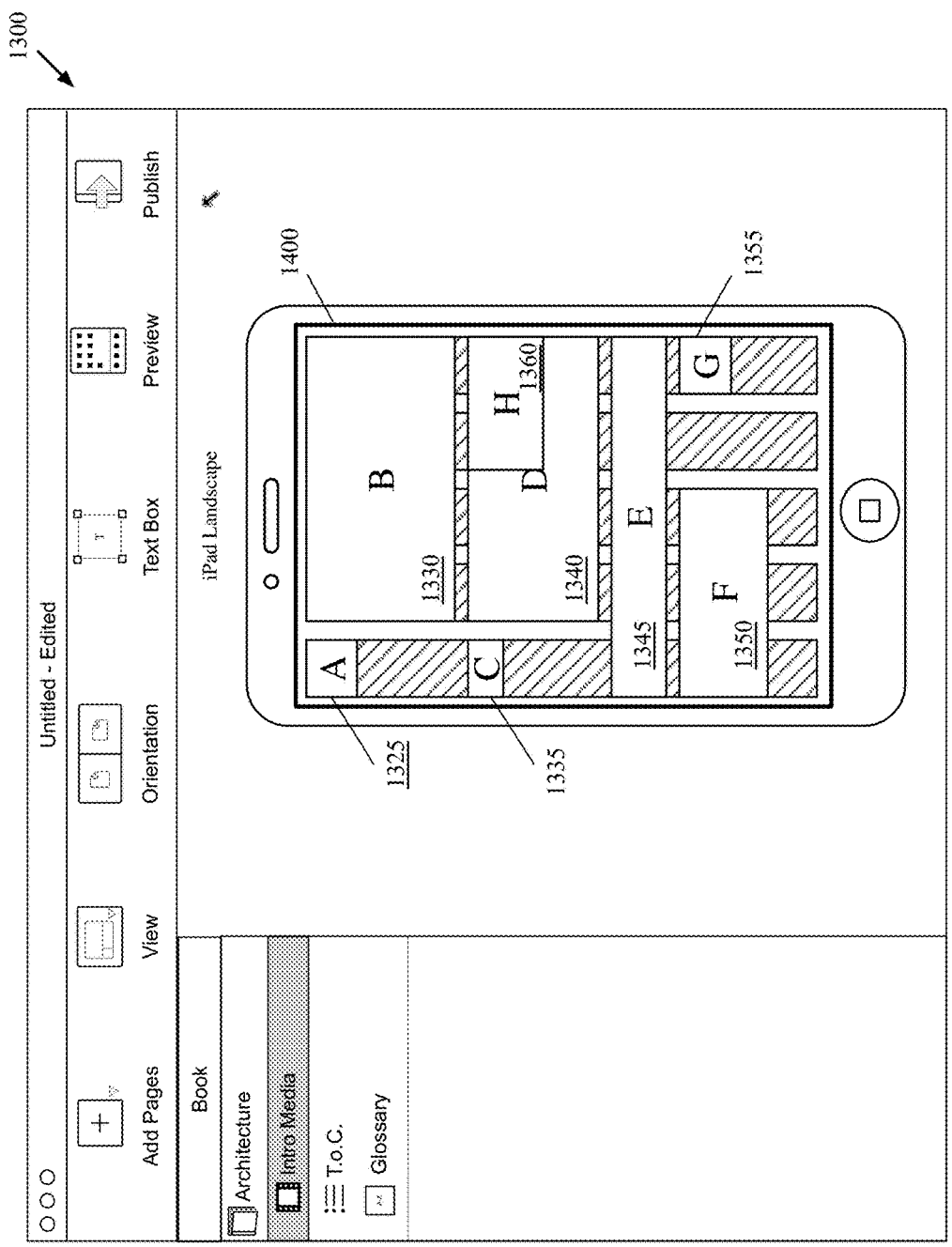
FIG. 14 illustrates the GUI of FIG. 13 with the layout editing and viewing section now displaying a rearranged five-column layout within the boundaries of an iPad screen in portrait orientation.

In this example, the user selects the "iPad Landscape" option, which corresponds to a five-column display. Thus, FIG. 14 illustrates the GUI 1300 with the layout editing and viewing section 1320 now displaying a rearranged five-column layout 1400 within the boundaries of an iPad screen in portrait orientation. In some embodiments, tablets always use five columns in portrait mode, though as described in the above-incorporated U.S. Provisional Patent Application 62/172,129 and the concurrently filed U.S. patent application Ser. No. 14/866,943, some embodiments calculate the number of columns to use based on the margin and gutter widths as well as the available display. In some embodiments, as shown, the editing application shows the columns in the background of the layout for the author's reference, though other embodiments do not display the columns (which are, or allow the user of the application to determine whether to view the columns.

In the five-column layout 1400, the first content block 1325, third content block 1335, and seventh content block 1355 have all been reduced from two columns to a single column in width. In addition, the second content block 1330 and fourth content block 1340 have been reduced from five columns to four columns in width, thereby exaggerating their size difference compared to the first and second content blocks. The fifth content block 1345 will span the entire width in any layout, as 7*(x/7) will always equal x. The sixth content block 1350 spans three of the five columns, again leaving a single column between it and the eighth content block 1355.

The eighth content block 1360 remains as two columns, even though the other two-column content blocks were reduced to a single column. This occurs because the content block 1360 is nested within the fourth content block 13, which is only reduced from five columns to four columns. Thus, the calculation for resizing the eighth content block 1360 uses a multiplier of 4/5 rather than 5/7, and 2×4/5=1.6, which rounds to 2. This allows the relative sizes of the sub-blocks nested within a content block to the content block itself to remain closer than they otherwise might.

Figure 15:
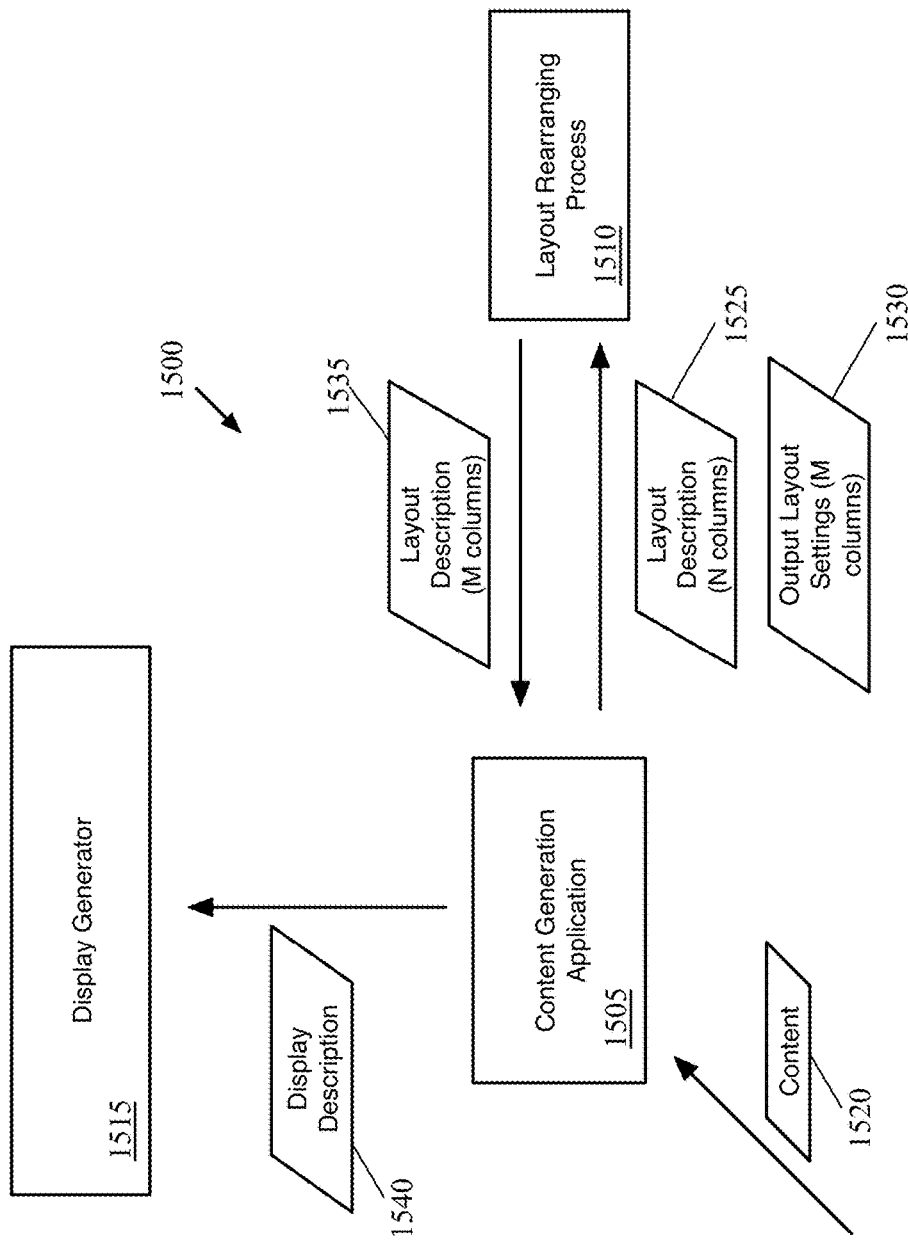
FIG. 15 conceptually illustrates the software architecture of a device of some embodiments used to generate content and view that content in various different layouts.

FIG. 15 conceptually illustrates the software architecture of a device 1500 of some embodiments used to generate content and view that content in various different layouts. As shown, the device 1500 includes a content generation application 1505, a layout rearranging process 1510, and a display generator 1515. This figure also shows the flow of certain data through these various software modules in the device.

The content generation application 1505 is utilized by a user of the device 1500 to create a layout, using content created in the application by the user (e.g., text, vector graphics) or otherwise imported into the application (e.g., images, etc.). This application, as mentioned above, may be an electronic book (or magazines, or other electronic publications) authoring application, such as iBooks Author. The application could also be a slide presentation application (e.g., Keynote, PowerPoint, etc.), a word processing application (e.g., Pages, Word, etc.), as well as other types of visual content creation applications.

The content generation application 1505, of some embodiments, receives this content and defines a layout according to user specifications (e.g., user input to arrange, format, and size the content, select the margins and gutter widths, select the number of columns for the layout, etc.). In addition, the content generation application defines its user interface for output, which may include a display of the user-generated layout. When the user wants to view how the layout will look on a device that uses a different number of columns, the content generation application 1505 uses the layout rearranging process 1510.

The layout rearranging process 1510 performs the process 300 of FIG. 3 or a similar process that takes as input a layout description spanning a first number of columns and outputs a description for the layout spanning a specified second number of columns (or calculates the second number of columns, in some embodiments). In this figure, the layout rearranging process 1510 is shown as a module separate from the content generation application 1505 (e.g., as an OS-level process). In some embodiments, the layout rearranging process is part of a framework that may be called by numerous different content generation applications that operate on a device. That is, the process 1510 could be used by the device's electronic book authoring application, word processor, slide presentation creation application, etc. In other embodiments, the layout rearranging process 1510 is part of the content generation application 1505. In addition, in some embodiments, the layout rearranging process 1510 includes a sub-module for computing the number of columns to use for a particular layout before performing the rest of the layout rearranging process.

The display generator 1515 is, in some embodiments, an operating system process that translates the output of the content generation application for a display device (or that of any other application, as well as the OS itself, that causes the display of content on the display device). That is, the display generator 1515 receives signals describing what should be displayed and translates these signals into pixel information that is sent to the display device (which may be part of the device 1500 or a separate device).

An example operation of the device 1500 will now be described. As shown, the content generation application 1505 receives content 1520. This may be received through the user interface of the application 1505 (e.g., the user creating content), through the import of content from a network or local media (e.g., images taken from the device's local drive, a flash drive, a connected mobile device, etc.). In addition, through user input, the content generation application 1505 defines a layout. In some embodiments, the application stores a layout description file that defines the settings for the layout (number of columns, gutter width, margin width, etc.) and describes the locations of various content blocks within the layout (location, number of columns spanned, height, etc.). This layout description file may also include references to some of the content (e.g., images) as well as specification of the text content, vector graphics content, etc. defined by the user. In this example, the user creates a layout having N columns.

When the user wants to view the created layout using a different number of columns (M columns), the content generation application calls the layout rearranging process 1510. In doing so, the content generation application provides as inputs to this process the layout description 1525 as generated by the user and output layout settings 1530 (i.e., the number of columns to use for the output layout). The layout rearranging process 1510 then generates a new layout description 1535 for M columns based on these inputs, which the content generation application 1505 incorporates into its UI. A display description 1540 for the UI as a whole, including the generated M-column layout, is passed to the display generator 1515 so that it can be output for the user to view on the display device.

III. Content Viewing Application

The above section relates to the layout rearrangement process as performed on a device used to generate content. In addition, this process (or a similar process) is performed by end user devices on which users view content. When the content was created using a specific number of columns, and the device (at least in its current orientation) displays layouts using a different number of columns, it will automatically perform a content rearrangement process to modify the layout for its own display. In some embodiments, this content rearrangement process includes identifying the number of columns to use for the layout based on the margin, gutter, and column width of the received layout. However, the figures in this example assume a default number of columns for specific devices and orientations.

Figure 16:
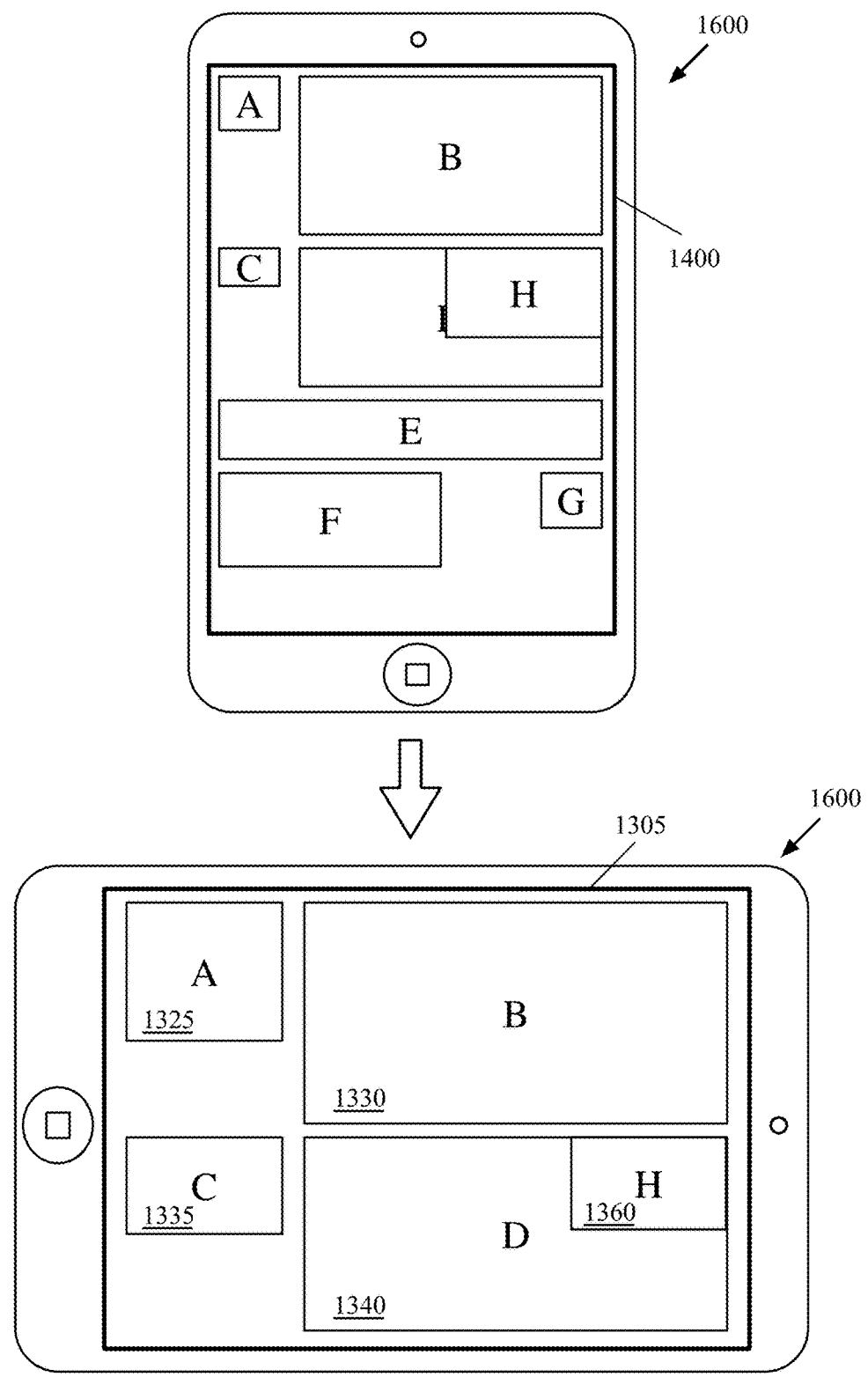
FIGS. 16 and 17 illustrate the layout of FIG. 13 as displayed on various end user devices, in both portrait and landscape orientation.
Figure 17:
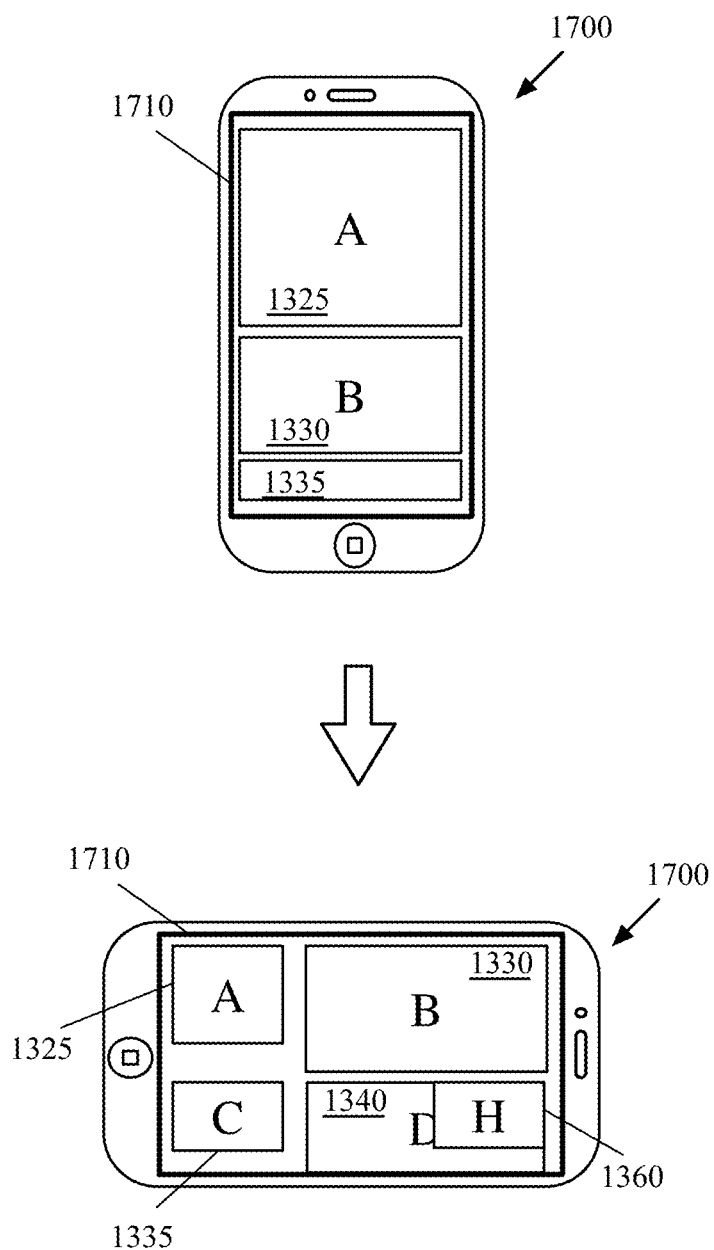

FIGS. 16 and 17 illustrate the layout 1305 as displayed on various end user devices. Specifically, FIG. 16 illustrates a tablet 1600 in both portrait and landscape orientation, while FIG. 17 illustrates a smart phone 1700 in both portrait and landscape orientations. In each of these figures, the respective device displays the layout 1305 with a different number of columns in the different orientations.

As shown in the top half of FIG. 16, the tablet 1600 is currently held in portrait orientation. In some embodiments, the tablet uses a default of five columns for displaying layouts when in portrait orientation. As illustrated in these figures, the end user devices do not display the columns when displaying content, as this aspect is hidden from the user (whereas the layout generation applications may display this for the author's reference in some embodiments). The tablet 1600 displays the five-column layout 1400 while in portrait orientation, as expected based on FIG. 14.

In the bottom half of this figure, the user of the tablet 1600 has adjusted the tablet so that it is now held in portrait orientation. In this case, the tablet displays the seven-column layout 1305, rather than the five-column layout 1400. However, only a portion of the layout 1305 fits on the display at a time. The top half of the layout, with the content blocks 1325-1340, as well as the content block 1360 (nested in the content block 1340) are currently displayed. The user can then scroll downward (e.g., through touch input) to view the remainder of the layout 1305 on the device.

As mentioned, FIG. 17 illustrates a smart phone 1700. In the top half of this figure, the smart phone 1700 is held in portrait orientation. In some embodiments, the smart phone uses a default of one column for displaying layouts in portrait orientation. Thus, the seven-column layout 1305 is converted into a single-column layout 1705 by the device 1700, with each of the content blocks occupying the full width of the display screen. In some embodiments, however, certain content blocks (e.g., images) may have minimum display settings. In this case, the image may be cropped (e.g., at its center, at its left or right edge, etc.), or the device allows for horizontal scrolling of the image. In order to maintain aspect ratios, the first content block 1325 is now actually larger than the second content block 1330. For the content block 1340, within which the content block 1360 is nested (these do not currently fit on the display), some embodiments display the content block 1360 over the content block 1340 (if text, the block 1340 could be transparent where the actual text is not located), whereas other embodiments would display the content block 1360 below its parent block 1340.

In the lower half of the figure, the user of the smart phone 1700 has adjusted the phone so that it is now held in landscape orientation. In some embodiments, the smart phone uses three columns in landscape orientation, in which case the columns will typically be narrower than the single column used for portrait orientation. In the three-column layout 1710, the first and third content blocks 1325 and 1335 are one column each, while the second and fourth content blocks 1330 and 1340 are two columns each. In this case, unlike the five-column layout 1400, the nested eighth content block 1360 is converted to the same width (one column) as the first and third content blocks, even with the block nesting factor.

Figure 18:
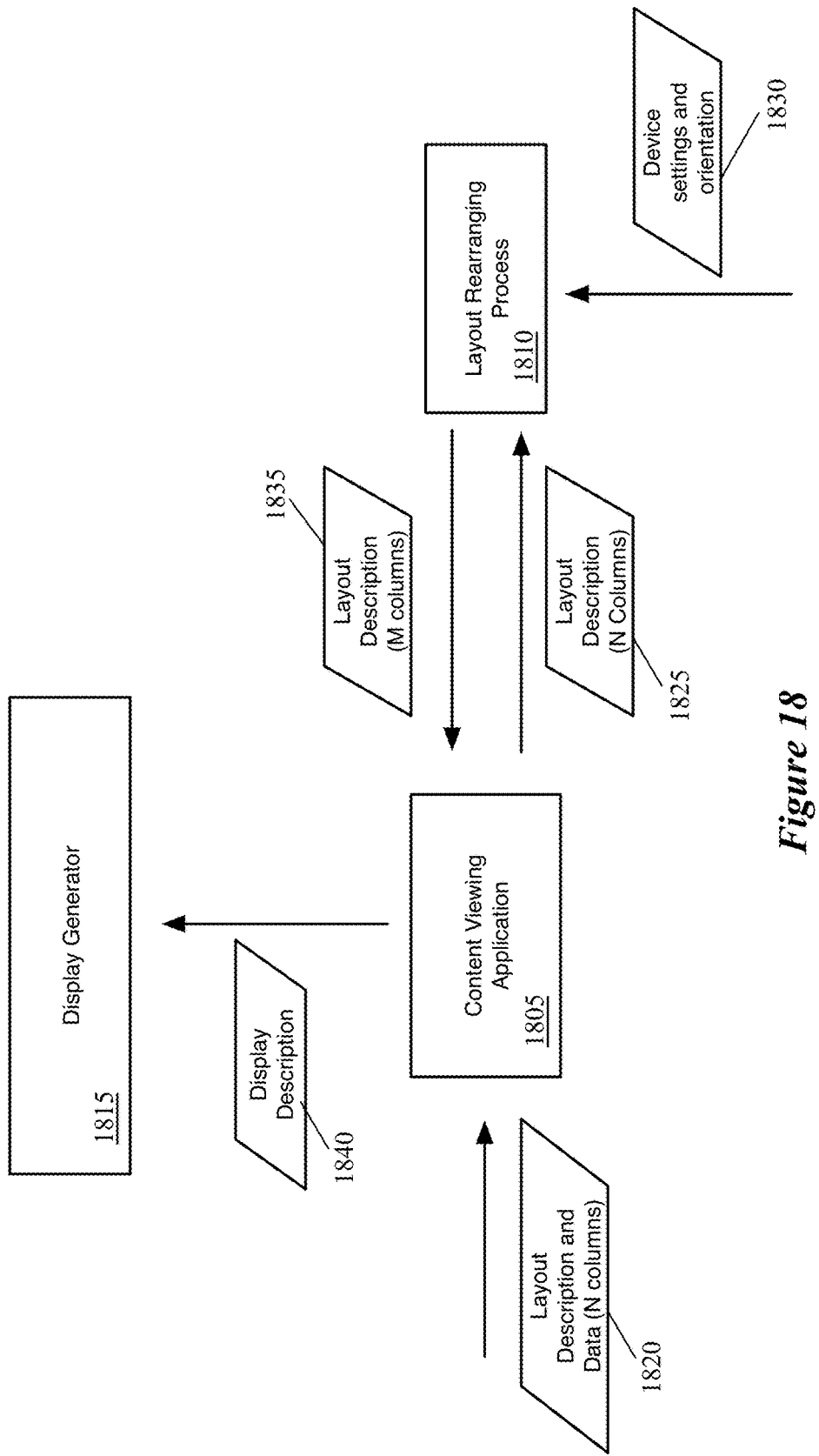
FIG. 18 conceptually illustrates the software architecture of an end user device of some embodiments used to generate layouts for display to a user that wishes to view content.

FIG. 18 conceptually illustrates the software architecture of an end user device 1800 of some embodiments used to generate layouts for display to a user that wishes to view content organized in the layouts as described above. The device 1800 may receive content layouts defined using a first number of columns, but be set to display the content using a second, different number of columns (either determined dynamically or using a default number of columns for the device). As shown, the device 1800 includes a content viewing application 1805, a layout rearranging process 1810, and a display generator 1815.

The content viewing application 1805 is utilized by a user of the device to view content on the device. This content may be received from a network (e.g., by downloading the content from a location on the Internet or a local network), stored on a local drive (either a permanent or removable drive) at the device, etc. Examples of such content may include electronic books or magazines, PDF documents, slide presentations, etc. The content viewing application 1805 might be an e-reader such as iBooks, a PDF viewer such as Preview, or the same type of application that was used to create the received layout (e.g., a word processor, a slide presentation application, etc.).

The layout rearranging process 1810 performs the process 300 of FIG. 3 or a similar process that takes as input a layout description spanning a first number of columns and outputs a description for the layout spanning a second number of columns. In some embodiments, the second number of columns is determined by the device settings and the current orientation of the device. In other embodiments, however, the second number of columns is determined based on the gutter, margin, and column widths, as described in the above-incorporated U.S. Provisional Patent Application 62/172,129 and the concurrently filed U.S. patent application Ser. No. 14/866,943.

In this figure, the layout rearranging process 1810 is shown as a module separate from the content viewing application 1805 (e.g., as an OS-level process). In some embodiments, the layout rearranging process is part of a framework that may be called by numerous different content generation applications that operate on a device. That is, the process 1810 could be used by the device's electronic book/document viewer, web browser, etc. In other embodiments, the layout rearranging process 1810 is part of the content viewing application 1805.

The display generator 1815 is, in some embodiments, an operating system process that translates the output of the content generation application for a display device (or that of any other application, as well as the OS itself, that causes the display of content on the display device). That is, the display generator 1815 receives signals describing what should be displayed and translates these signals into pixel information that is sent to the display device (which may be part of the device 1800 or a separate device).

An example operation of the end user device 1800 for viewing content will now be described. As shown, the content viewing application 1805 receives a layout description and content data 1820. In some embodiments, the viewer receives a layout description file that defines the layout settings (number of columns, gutter width, margins, etc.) and the location/arrangement of the content blocks in the layout. This layout description file may also include vector graphics, text content, etc., as well as links to images or other content used in the layout.

However, the layout description may not be defined with the correct number of columns for display on the device 1800. As such, the content viewing application 1805 calls the layout rearranging process 1810. In doing so, the content viewing application provides the layout description 1825 that it received as an input to this process. In addition, the layout rearranging process 1810 receives device settings and the current device orientation 1830. The device settings may be constants that are part of the code for the layout rearranging process in some embodiments, such as the number of columns to use for display in portrait and/or landscape orientations. In other embodiments, the device settings specify the width of the device in its current orientation, which is used to determine the number of columns for the layout.

The layout rearranging process 1810 then generates a new layout description 1835 based on these inputs, with the appropriate number of columns for the current device orientation. In some embodiments, the process 1810 actually generates layout descriptions for both portrait and landscape orientations, so that the content viewing application 1805 can use the current orientation to output the correct layout. The content viewing application 1805 incorporates the layout description into its UI, and a display description 1840 is passed to the display generator 1815 so that it can be output for the user to view on the display device.

IV. Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

A. Mobile Device

Figure 19:
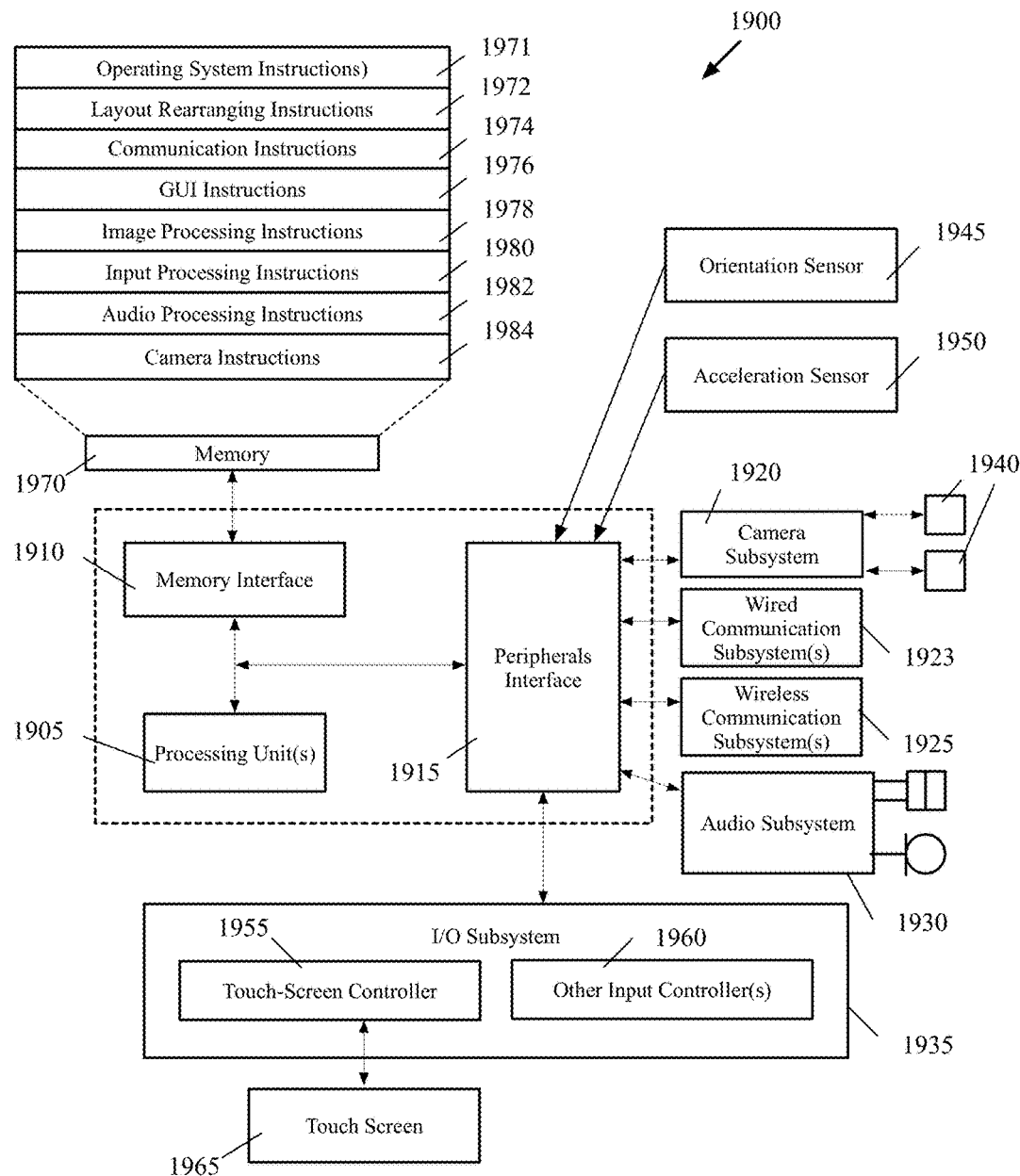
FIG. 19 illustrates an example of an architecture of a mobile computing device with which some embodiments are implemented.

The user data sharing of some embodiments occurs on mobile devices, such as smart phones (e.g., iPhones®) and tablets (e.g., iPads®). FIG. 19 is an example of an architecture 1900 of such a mobile computing device. As shown, the mobile computing device 1900 includes one or more processing units 1905, a memory interface 1910 and a peripherals interface 1915.

The peripherals interface 1915 is coupled to various sensors and subsystems, including a camera subsystem 1920, a wired communication subsystem(s) 1923, a wireless communication subsystem(s) 1925, an audio subsystem 1930, an I/O subsystem 1935, etc. The peripherals interface 1915 enables communication between the processing units 1905 and various peripherals. For example, an orientation sensor 1945 (e.g., a gyroscope) and an acceleration sensor 1950 (e.g., an accelerometer) is coupled to the peripherals interface 1915 to facilitate orientation and acceleration functions.

The camera subsystem 1920 is coupled to one or more optical sensors 1940 (e.g., a charged coupled device (CCD) optical sensor, a complementary metal-oxide-semiconductor (CMOS) optical sensor, etc.). The camera subsystem 1920 coupled with the optical sensors 1940 facilitates camera functions, such as image and/or video data capturing. The wired communication subsystem 1923 and wireless communication subsystem 1925 serve to facilitate communication functions.

In some embodiments, the wireless communication subsystem 1925 includes radio frequency receivers and transmitters, and optical receivers and transmitters (not shown in FIG. 19). These receivers and transmitters of some embodiments are implemented to operate over one or more communication networks such as a GSM network, a Wi-Fi network, a Bluetooth network, etc. The audio subsystem 1930 is coupled to a speaker to output audio (e.g., to output voice navigation instructions). Additionally, the audio subsystem 1930 is coupled to a microphone to facilitate voice-enabled functions in some embodiments.

The I/O subsystem 1935 involves the transfer between input/output peripheral devices, such as a display, a touch screen, etc., and the data bus of the processing units 1905 through the peripherals interface 1915. The I/O subsystem 1935 includes a touch-screen controller 1955 and other input controllers 1960 to facilitate the transfer between input/output peripheral devices and the data bus of the processing units 1905. As shown, the touch-screen controller 1955 is coupled to a touch screen 1965. The touch-screen controller 1955 detects contact and movement on the touch screen 1965 using any of multiple touch sensitivity technologies. The other input controllers 1960 are coupled to other input/control devices, such as one or more buttons. Some embodiments include a near-touch sensitive screen and a corresponding controller that can detect near-touch interactions instead of or in addition to touch interactions.

The memory interface 1910 is coupled to memory 1970. In some embodiments, the memory 1970 includes volatile memory (e.g., high-speed random access memory), non-volatile memory (e.g., flash memory), a combination of volatile and non-volatile memory, and/or any other type of memory. As illustrated in FIG. 19, the memory 1970 stores an operating system (OS) 1971. The OS 1971 includes instructions for handling basic system services and for performing hardware dependent tasks. The memory 1970 additionally includes layout rearranging instructions 1972 in order for the device 1900 to perform the layout rearranging process of some embodiments. In some embodiments, these instructions 1972 may be a subset of the operating system instructions 1971, or may be part of the instructions for an application.

The memory 1970 also includes communication instructions 1974 to facilitate communicating with one or more additional devices (e.g., for peer-to-peer data sharing, or to connect to a server through the Internet for cloud-based data sharing); graphical user interface instructions 1976 to facilitate graphic user interface processing; image processing instructions 1978 to facilitate image-related processing and functions; input processing instructions 1980 to facilitate input-related (e.g., touch input) processes and functions; audio processing instructions 1982 to facilitate audio-related processes and functions; and camera instructions 1984 to facilitate camera-related processes and functions. The instructions described above are merely exemplary and the memory 1970 includes additional and/or other instructions in some embodiments. For instance, the memory for a smartphone may include phone instructions to facilitate phone-related processes and functions. The above-identified instructions need not be implemented as separate software programs or modules. Various functions of the mobile computing device can be implemented in hardware and/or in software, including in one or more signal processing and/or application specific integrated circuits.

While the components illustrated in FIG. 19 are shown as separate components, one of ordinary skill in the art will recognize that two or more components may be integrated into one or more integrated circuits. In addition, two or more components may be coupled together by one or more communication buses or signal lines. Also, while many of the functions have been described as being performed by one component, one of ordinary skill in the art will realize that the functions described with respect to FIG. 19 may be split into two or more integrated circuits.

B. Computer System

Figure 20:
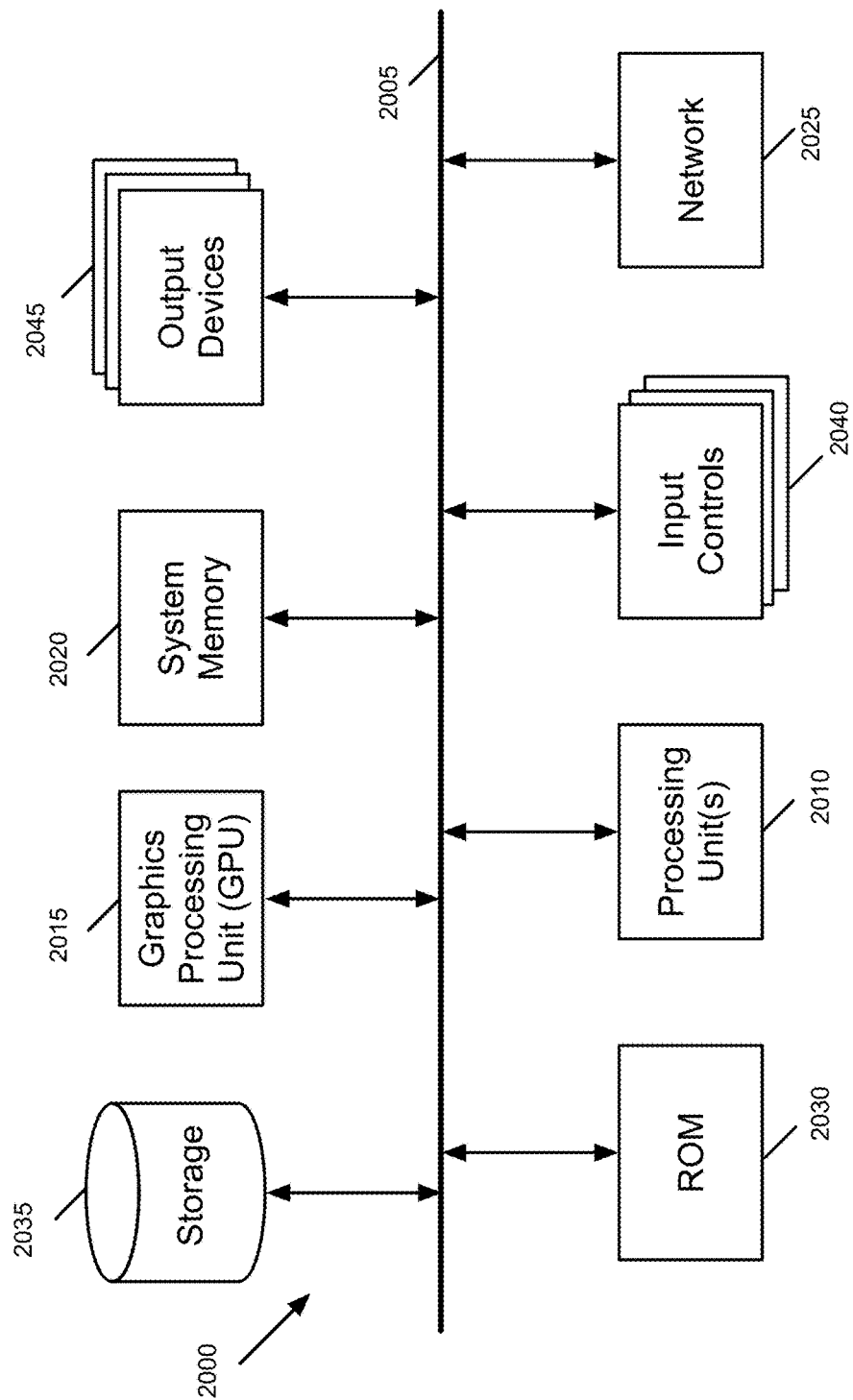
FIG. 20 conceptually illustrates another example of an electronic system with which some embodiments of the invention are implemented.

FIG. 20 conceptually illustrates another example of an electronic system 2000 with which some embodiments of the invention are implemented. The electronic system 2000 may be a computer (e.g., a desktop computer, personal computer, tablet computer, etc.), phone, PDA, or any other sort of electronic or computing device. Such an electronic system includes various types of computer readable media and interfaces for various other types of computer readable media. Electronic system 2000 includes a bus 2005, processing unit(s) 2010, a graphics processing unit (GPU) 2015, a system memory 2020, a network 2025, a read-only memory 2030, a permanent storage device 2035, input devices 2040, and output devices 2045.

The bus 2005 collectively represents all system, peripheral, and chipset buses that communicatively connect the numerous internal devices of the electronic system 2000. For instance, the bus 2005 communicatively connects the processing unit(s) 2010 with the read-only memory 2030, the GPU 2015, the system memory 2020, and the permanent storage device 2035.

From these various memory units, the processing unit(s) 2010 retrieves instructions to execute and data to process in order to execute the processes of the invention. The processing unit(s) may be a single processor or a multi-core processor in different embodiments. Some instructions are passed to and executed by the GPU 2015. The GPU 2015 can offload various computations or complement the image processing provided by the processing unit(s) 2010. In some embodiments, such functionality can be provided using CoreImage's kernel shading language.

The read-only-memory (ROM) 2030 stores static data and instructions that are needed by the processing unit(s) 2010 and other modules of the electronic system. The permanent storage device 2035, on the other hand, is a read-and-write memory device. This device is a non-volatile memory unit that stores instructions and data even when the electronic system 2000 is off. Some embodiments of the invention use a mass-storage device (such as a magnetic or optical disk and its corresponding disk drive, integrated flash memory) as the permanent storage device 2035.

Other embodiments use a removable storage device (such as a floppy disk, flash memory device, etc., and its corresponding drive) as the permanent storage device. Like the permanent storage device 2035, the system memory 2020 is a read-and-write memory device. However, unlike storage device 2035, the system memory 2020 is a volatile read-and-write memory, such a random access memory. The system memory 2020 stores some of the instructions and data that the processor needs at runtime. In some embodiments, the invention's processes are stored in the system memory 2020, the permanent storage device 2035, and/or the read-only memory 2030. For example, the various memory units include instructions for processing multimedia clips in accordance with some embodiments. From these various memory units, the processing unit(s) 2010 retrieves instructions to execute and data to process in order to execute the processes of some embodiments.

The bus 2005 also connects to the input and output devices 2040 and 2045. The input devices 2040 enable the user to communicate information and select commands to the electronic system. The input devices 2040 include alpha-numeric keyboards and pointing devices (also called "cursor control devices"), cameras (e.g., webcams), microphones or similar devices for receiving voice commands, etc. The output devices 2045 display images generated by the electronic system or otherwise output data. The output devices 2045 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 20, bus 2005 also couples electronic system 2000 to a network 2025 through a network adapter (not shown). In this manner, the computer can be a part of a network of computers (such as a local area network ("LAN"), a wide area network ("WAN"), or an Intranet), or a network of networks, such as the Internet. Any or all components of electronic system 2000 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. For instance, a number of the figures (including FIG. 3) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A method for rearranging a content layout, the method comprising:

receiving a first content layout comprising a plurality of content elements arranged across a first set of vertical layout sections, each vertical layout section of the first set occupying a same first amount of horizontal space in the first content layout, wherein at least one of the content elements spans a plurality of the vertical layout sections of the first set;

identifying a number of vertical layout sections available with which to display the first content layout; and rearranging the plurality of content elements into a second content layout comprising the plurality of content elements arranged across a second set of vertical layout sections, each vertical layout section of the second set occupying a same second amount of horizontal space in the second content layout, wherein the rearranging comprises, for each content element of the plurality of content elements, determining a number of vertical layout sections of the second set for the content element to span in the second content layout by multiplying a number of vertical layout sections of the first set of vertical layout sections spanned by the content element by a ratio of the number of vertical layout sections in the second set to the number of vertical layout sections in the first set, wherein at least one of the content elements spans a different number of vertical layout sections in the first content layout and the second content layout.

2. The method of claim 1, wherein each of the content elements occupies a rectangular portion of the first content layout.

3. The method of claim 1, wherein the first content layout is defined by a content creator, wherein a number of vertical layout sections in the first set is determined by the content creator.

4. The method of claim 1, wherein the method is performed by a first device different from a second device on which the first content layout is defined, wherein identifying the number of vertical layout sections in the second comprises determining a setting of the first device for a current orientation of the first device.

5. The method of claim 1, wherein rearranging the plurality of content elements comprises, for a first content element:

resizing the first content element; and placing the first content element at a first location in the second content layout.

6. The method of claim 5, wherein rearranging the plurality of content elements further comprises, for each particular additional content element of the plurality of content elements:

resizing the particular content element; and placing the particular content element at a particular location in the second content layout.

7. The method of claim 5, wherein multiplying the number of vertical layout sections of the first set spanned by the first content element by a ratio of the number of vertical layout sections in the second set to the number of vertical layout sections in the first set generates a result, wherein determining the number of vertical layout sections of the second set for the first content element to span comprises rounding the result to an integer number of vertical layout sections of the second set.

8. The method of claim 5, wherein resizing the first content element comprises expanding or reducing a size of the first content element to span the determined number of vertical layout sections while maintaining an aspect ratio of the first content element.

9. The method of claim 5, wherein placing the first content element at a first location in the second content layout comprises:

determining content to which the first content element is aligned in the first content layout; and maintaining the alignment in the second content layout.

10. The method of claim 9, wherein the content to which the first content element is aligned comprises a portion of body text of the layout.

11. The method of claim 9, wherein the content to which the first content element is aligned comprises at least one of a vertical edge and a horizontal edge of a second content element in the layout.

12. The method of claim 9, wherein the content to which the first content element is aligned comprises an edge of the layout.

13. The method of claim 5, wherein the set of instructions for rearranging the plurality of content elements further comprises:

prior to placing the first content element at the first location in the second content layout, placing body text that spans a full width of the second content layout; and while placing the first content element, rearranging the body text to flow around the first content element.

14. A non-transitory machine readable medium storing a program which when executed by at least one processing unit rearranges a content layout, the program comprising sets of instructions for:

receiving a first content layout comprising a plurality of content elements arranged across a first set of vertical layout sections, each vertical layout section of the first set occupying a same first amount of horizontal space in the first content layout, wherein at least one of the content elements spans a plurality of the vertical layout sections of the first set;

identifying a number of vertical layout sections available with which to display the first content layout; and rearranging the plurality of content elements into a second content layout comprising the plurality of content elements arranged across a second set of vertical layout sections, each vertical layout section of the second set occupying a same second amount of horizontal space in the second content layout, wherein the set of instructions for rearranging comprises sets of instructions for determining, for each content element of the plurality of content elements, a number of vertical layout sections of the second set for the content element to span in the second content layout by multiplying a number of vertical layout sections of the first set of vertical layout sections spanned by the content element by a ratio of the number of vertical layout sections in the second set to the number of vertical layout sections in the first set, wherein at least one of the content elements spans a different number of vertical layout sections in the first content layout and the second content layout.

15. The non-transitory machine readable medium of claim 14, wherein the first content layout is defined by a content creator, wherein a number of vertical layout sections in the first set is determined by the content creator.

16. The non-transitory machine readable medium of claim 14, wherein the program is executed by a first device different from a second device on which the first content layout is defined, wherein the set of instructions for identifying the number of vertical layout sections in the second comprises a set of instructions for determining a setting of the first device for a current orientation of the first device.

17. The non-transitory machine readable medium of claim 14, wherein the set of instructions for rearranging the plurality of content elements comprises sets of instructions for:
 resizing a first content element; and
 placing the first content element at a first location in the second content layout.

18. The non-transitory machine readable medium of claim 17, wherein:
 the set of instructions for calculating the number of vertical layout sections of the second set for the first content element to span comprises a set of instructions for multiplying the number of vertical layout sections of the first set spanned by the first content element by a ratio of the number of vertical layout sections in the second set to the number of vertical layout sections in the first set generates a result, wherein the set of instructions for determining the number of vertical layout sections of the second set to span comprises a set of instructions for rounding the result to an integer number of vertical layout sections of the second set; and
 the set of instructions for resizing the first content element comprises a set of instructions for expanding or reducing a size of the first content element to span the determined number of vertical layout sections while maintaining an aspect ratio of the first content element.

19. An electronic device comprising:
a set of hardware processing units; and
a non-transitory machine readable medium storing a program which when executed by at least one of the processing units rearranges a content layout, the program comprising sets of instructions for:
 receiving a first content layout comprising a plurality of content elements arranged across a first set of vertical layout sections, each vertical layout section of the first set occupying a same first amount of horizontal space in the first content layout, wherein at least one of the content elements spans a plurality of the vertical layout sections of the first set;
 identifying a number of vertical layout sections available with which to display the first content layout; and
 rearranging the plurality of content elements into a second content layout comprising the plurality of content elements arranged across a second set of vertical layout sections, each vertical layout section of the second set occupying a same second amount of horizontal space in the second content layout,
 wherein the set of instructions for rearranging comprises sets of instructions for determining, for each content element of the plurality of content elements, a number of vertical layout sections of the second set for the content element to span in the second content layout by multiplying a number of vertical layout sections of the first set of vertical layout sections spanned by the content element by a ratio of the number of vertical layout sections in the second set to the number of vertical layout sections in the first set, wherein at least one of the content elements spans a different number of vertical layout sections in the first content layout and the second content layout.

20. The electronic device of claim 19, wherein the set of instructions for rearranging the plurality of content elements comprises sets of instructions for:
 resizing a first content element; and
 placing the first content element at a first location in the second content layout.

21. The electronic device of claim 20, wherein the set of instructions for placing the first content element at a first location in the second content layout comprises sets of instructions for:
 determining content to which the first content element is aligned in the first content layout; and
 maintaining the alignment in the second content layout.

22. The electronic device of claim 21, wherein the content to which the first content element is aligned comprises at least one of a portion of body text of the layout, a vertical edge of a second content element in the layout, a horizontal edge of a second content element in the layout, and an edge of the layout.

23. The electronic device of claim 20, wherein the set of instructions for rearranging the plurality of content elements further comprises sets of instructions for:
 prior to placing the first content element at the first location in the second content layout, placing body text that spans a full width of the second content layout; and
 while placing the first content element, rearranging the body text to flow around the first content element.

* * * * *